United States Patent [19]
Assa et al.

[11] Patent Number: 6,128,577
[45] Date of Patent: Oct. 3, 2000

[54] MODELING GEOLOGICAL STRUCTURES AND PROPERTIES

[75] Inventors: Steven Brent Assa; George William Celniker, both of Austin; David Mack Endres, Leander, all of Tex.

[73] Assignee: Schlumberger Technology Corporation, Austin, Tex.

[21] Appl. No.: 08/772,082

[22] Filed: Dec. 19, 1996

[51] Int. Cl.$^7$ .................................................. G06F 19/00
[52] U.S. Cl. ............................................................ 702/2
[58] Field of Search ....................... 364/420, 421, 364/422; 707/104; 702/2, 5, 16, 11

[56] References Cited

U.S. PATENT DOCUMENTS

| | | | |
|---|---|---|---|
| 4,314,338 | 2/1982 | Suau et al. | 364/422 |
| 4,340,934 | 7/1982 | Segesman | 364/422 |
| 4,679,174 | 7/1987 | Gelfand | 367/73 |
| 4,821,214 | 4/1989 | Sederberg | 364/522 |
| 4,858,149 | 8/1989 | Quarendon | 395/125 |
| 4,890,242 | 12/1989 | Sinha et al. | 395/119 |
| 4,912,664 | 3/1990 | Weiss et al. | 364/577 |
| 4,922,254 | 5/1990 | Schuessler et al. | 342/25 |
| 4,928,233 | 5/1990 | Millis | 364/522 |
| 4,944,034 | 7/1990 | Ohsawa | 364/522 |
| 4,969,130 | 11/1990 | Wason et al. | 367/73 |

(List continued on next page.)

FOREIGN PATENT DOCUMENTS

| | | |
|---|---|---|
| 0 299 862 A2 | 1/1987 | European Pat. Off. . |
| 2300736 | 11/1996 | United Kingdom . |
| 2309562 | 7/1997 | United Kingdom . |
| WO 91/04544 | 4/1991 | WIPO ........................................ 15/72 |
| PCTUS97/24278 | 5/1998 | WIPO . |

OTHER PUBLICATIONS

Jesperson, S.K., et al., "Modeling of Received Signals from Interfaces of Arbitrary Geometry", *1995 IEEE Ultrasonics Symposium*, published Jul. 11, 1995, pp. 1561–1565.

Bode, T. et al. "First experiences with Geostore, an information system for geologically defined geometries" IGIS '94: Geographic Information Systems, International Workshop On Advanced Research In Geographic Information Systems. ISBN 3–540–58795–0, 1994, Berlin, Springer–Verlag, Germany, pp. 35–44, XP002064462.

Jones, C.B. "Data structures for three–dimensional spatial information systems in geology," International Journal of Geographical Information Systems, Jan.–Mar. 1989, UK, vol. 3, No. 1, ISSN 0269–3798, pp. 15–31, XP002064461.

(List continued on next page.)

*Primary Examiner*—Donald E. McElheny, Jr.
*Attorney, Agent, or Firm*—Howard L. Speight

[57] ABSTRACT

The invention features a method, computer system, and computer program for analyzing geological data stored on computer-readable media, including organizing the data to represent a plurality of sub-regions and a feature, and classifying the feature into a subset of the plurality of sub-regions. The method, computer system, and computer program analyze geological data stored on computer-readable media, including organizing the data to represent a plurality of sub-regions, and editing the sub-regions. The method, computer system, and computer program analyze geological data stored on computer-readable media, including organizing the data into a database, which includes a geometry part and a separate design part. The method, computer system, and computer program includes preserving the shape of a feature during classification and editing. The method, computer system, and computer program organize geological data to represent a region and subdivide the region into a first sub-region and a second sub-region with a boundary at a first location. The method, computer system, and computer program analyze geological data stored on computer-readable media, comprising organizing the data to represent a plurality of sub-regions; attaching a material property to each of the plurality of sub-regions; editing one sub-region of the plurality of sub-regions to produce a second plurality of sub-regions; and propagating the material property from the one sub-region of the plurality of sub-regions to the second plurality of sub-regions.

72 Claims, 25 Drawing Sheets

U.S. PATENT DOCUMENTS

| | | | |
|---|---|---|---|
| 5,003,498 | 3/1991 | Ota et al. ................................. | 364/522 |
| 5,010,502 | 4/1991 | Diebel et al. ........................... | 364/522 |
| 5,012,431 | 4/1991 | Stanziola ................................ | 364/526 |
| 5,214,613 | 5/1993 | Esmersoy ................................. | 367/31 |
| 5,355,088 | 10/1994 | Howard, Jr. ............................ | 324/339 |
| 5,394,325 | 2/1995 | Schneider, Jr. .......................... | 364/421 |
| 5,553,492 | 9/1996 | Barrett et al. ............................ | 73/152 |
| 5,647,058 | 7/1997 | Agrawal et al. ........................ | 707/104 |
| 5,682,330 | 10/1997 | Seaman et al. .......................... | 707/104 |

OTHER PUBLICATIONS

Raafat, Hazem M. "An extended relational database for remotely sensed image data management within GIS," IEEE Transactions On Geoscience and Remote Sensing, vol. 29, No. 4, Jul. 1991, New York, pp. 651–655, XP000258538.

Ames, Arlo, "Production ready feature recognition based automatic group technology part coding", proceedings of *Symposium on Solid Modeling Foundations and CAD/CAM Applications*, Rossignac/Turner editors, Austin, TX, Jun. 5–7, 1991, p. 161.

Baumgart, B., "Winged–edge Polyhedron Representation", *Stanford Artificial Intelligence Report*, No. CS–320, Oct. 1972.

Braid, I.C. et al., "Stepwise Construction of Polyhedra in Geometric Modeling", *Mathematical Methods in Computer Graphics and Design*, K.S. Brodlie editor, Academic Press, 1980.

Brown, A.R., "Interpretation of Three–Dimensional Seismic Data", 3rd Ed., *American Association of Petroleum Geologists*, Tulsa OK, 1986, pp. 67–177.

Celniker, G. et al., "Deformable Curve and Surface Finite Elements for Free–Form Shape Design", *Computer Graphics*, vol. 25, No. 4, 1991.

Celniker, G. et al., "Visualization and Modeling of Geophysical Data", *Proceedings Visualization '93*, San Jose, CA, Oct. 25–29, 1993.

da Silva, R.E. et al., "An Algebraic Approach to Geometric Query Processing in CAD/CAM Applications", proceedings of *Symposium on Solid Modeling Foundations and CAD/CAM Applications*, Rossignac & Turner editors, Austin, TX, Feb. 22, 1991.

De Martino, T. et al., "Feature–based Modelling by Integrating Design and Recognition Approaches", *Computer–Aided Design*, vol. 26, No. 8, Aug. 1994.

Duan, W. et al., "FSMT: A Feature Solid–Modelling Tool for Feature–Based Design and Manufacture", *Computer–Aided Design*, vol. 25, No. 1, Jan., 1993.

Farin, G., "Curves and Surfaces for Computer Aided Geometric Design", *Academic Press*, 2d ed., New York, 1990.

*3D VSP–3D Vertical Seismic Profile Modeling*, http://www.gxt.com/productinfo/3dvspinfo.html, GX Technology Corporation, Houston, TX. No date.

Glassner, A.S., *Useful 3D Geometry*, Graphics Gems, Academic Press, ISBN 0–12–286165–5, pp. 297–339, 485–571.

Heymans, M. et al., "Testing Hydrocarbon Saturation Models for Use in Original Oil–In–Place Estimation:, South Dome of Oregon Basin Field, Park County, Wyoming", *Computer Modeling of Geologic Surfaces and Volumes*, AAPG Computer Applications in Geology, No. 1, The American Association of Petroleum Geologists.

Hughes, T.J.R., *The Finite Element Method —Linear, Static and Dynamic Finite Element Analysis*, Prentice Hall, Englewood Cliffs, N.J., 1987.

Laakko, T. et al., "Feature Modelling by Incremental Feature Recognition", *Computer–Aided Design*, vol. 25, No. 8, Aug. 1993.

Lorenson, W.E., et al., "Marching Cubes: A High Resolution 3D Surface Construction Algorithm", *Computer Graphics*, vol. 21, No. 4, Jul. 1987.

Lou, Y. et al., "A Boundary Representation for Form Features and Non–Manifold Solid Objects", Proceedings of *Symposium on Solid Modeling Foundations and CAD/CAM Applications*, Rossignac & Turner editors, Austin TX, Jun. 5–7, 1991.

Lovell, J., *Finite Element Methods in Resistivity Logging*, Ph.D. dissertation, Technical University Delft, 1993. pp. 1–18, 67–70, 170–176.

Millman, R.S. et al., *Elements of Differential Geometry*, Prentice Hall, Englewood Cliffs, N.J., 1977, pp. 173–242.

Munkres, J.R., *Elements of Algebraic Topology*, Benjamin/Cummings Publishing Co., Inc., Menlo Park, CA, 1984, pp. 1–128, 368–446.

Pratt, M.J., "Synthesis of an Optimal Approach to Form Feature Modelling", in *Proceedings of the ASME International Computers in Engineering Conference and Exhibition*, San Francisco, CA, Jul. 31–Aug. 4, 1988, pp. 263–274.

Shah, J.J. et al., "Feature–Based Modeling Shell. Design and Implementation", *Computers in Engineering*, pp. 255–261, Dept. of Mech. and Aerospace Eng., Arizona St. University, Tempe, AZ, 1988.

Simmons, R.G., "Representing and Reasoning About Change in Geologic Interpretation", *Technical Report 749*, MIT Artificial Intelligence Laboratory, Dec. 1983, pp. 6–21, 108–121.

Weiler, K.J., *Topological Structures for Geometric Modeling*, Ph.D. thesis, Rensselaer Polytechnic Institute, Troy, New York, Aug., 1986, pp. 31–41, 59–89, 118–147, 186–214.

Wyatt, K.D., et al., "Building Velocity–Depth Models for 3D Depth Migration", *The Leading Edge*, vol. 13, No. 8, Aug. 1994, pp. 862–866.

Teller, S. et al., "Partitioning and Ordering Large Radiosity Computations", *Computer Graphics Proceedings*, Annual Conference Series, 1994, pp. 443–450.

*Product Availability by Platform*, http://www.gxt.com/productinfo/platformlist.html#3daims, GX Technology Corporation, Houston, TX, No Date Provided.

*Product Availability by Platform*, http://www.gxt.com/productinfo/platformlist.html, GX Technology Corporation, Houston, TX. No Date Provided.

*Product Information*, http://www.gxt.com/produtcinfo/productinfo.html, GX Technology Corporation, Houston, TX. No Date Provided.

Young et al., "A Computer–Aided Geological Interpretation System for Subsurface Imaging", Geoscience and Remote Sensing, vol. 2, 1994 pp. 854–856, Dec. 1994.

Roelofs, "Applying Semantic Data Modeling Techniques To Large Mass Storage System Designs", Mass Storage Systems, 1990, 10th IEEE Symposium, pp. 65–76, Dec. 1994.

Duff et al., "Applications of Object–Oriented Approaches to Expert Systems in the Earth Sciences", Developing and Managing Expert System Programs, 1991, pp. 160–165, Dec. 1991.

Benediktsson et al., "Classification and Feature Extraction of AVIRIS Data", IEEE Transactions on Geoscience and Remote Sensing, vol. 33, Iss. 5, pp. 1194–1205, Aug. 1995.

Zhou et al., "An Expert System For Pattern Recognition On Features And Knowledge", Pattern Recognition, 1988 9th Internation Conference, pp. 1239–1241, Dec. 1988.

Starks, Navigating Large Databases Using A New High–Level Computer Language, Northcon/95, pp. 49–54, Dec 1995.

Brown et al., "Collection And Quality Of Marine Geological Data By The Ocean Drilling Program", Oceans '88: A Partnership of Marine Interest, 1012–1017, Dec. 1988.

Mallet, J. L., "GOCAD: A computer–Aided Design Program for Geological Applications", Jun. 1989, pp. 1–37.

Mallet, J.L., "Discrete Smooth Interpolation in Geometric Modelling", *Computer–Aided Design,* vol. 24, No. 4, Apr. 1992, pp.172–192.

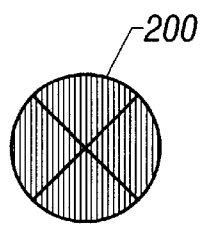 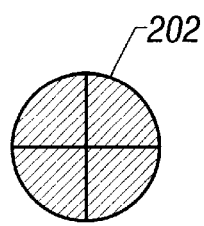 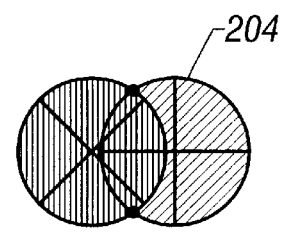
Figure 9A                                   Figure 9B
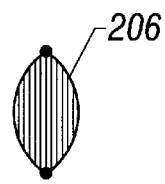
Figure 9C
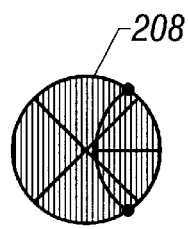 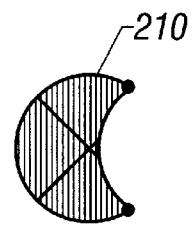
Figure 9D                                   Figure 9E
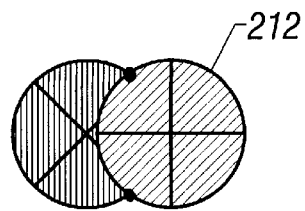 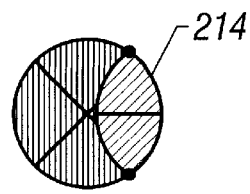
Figure 9F                                   Figure 9G

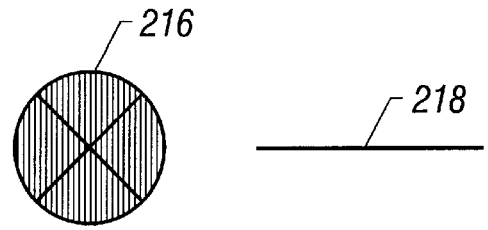
Figure 10A
Figure 10B  Figure 10C
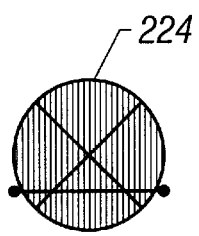 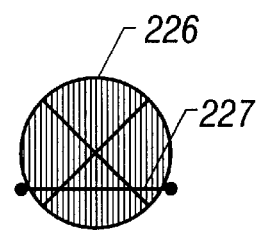
Figure 10D  Figure 10E
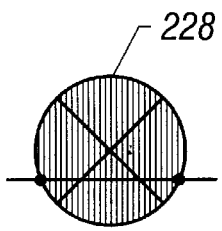 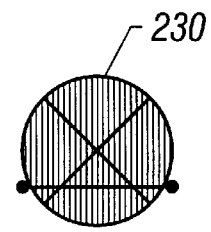
Figure 10F  Figure 10G

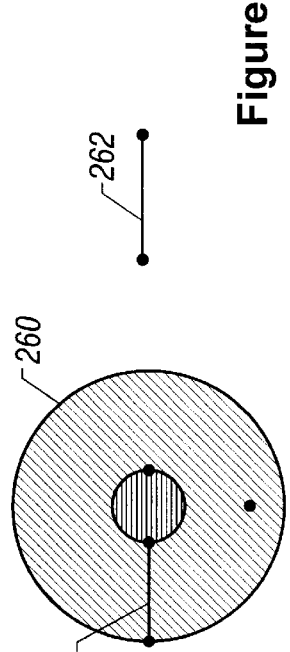
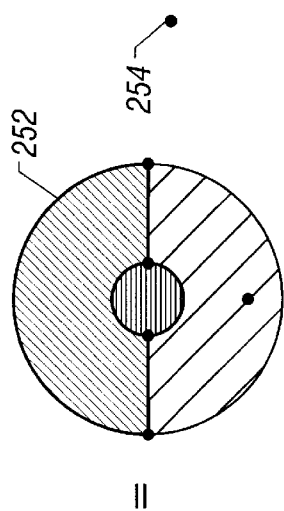
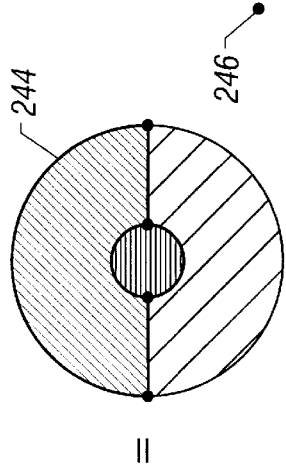
Figure 11A
Figure 11B
Figure 11C
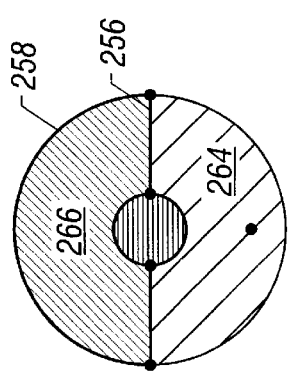
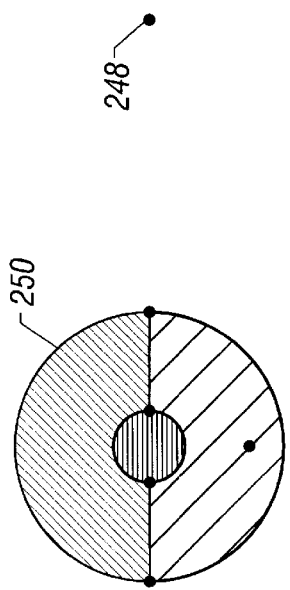
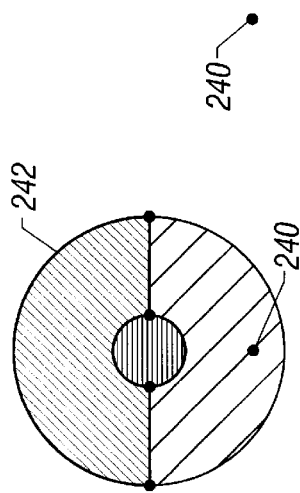

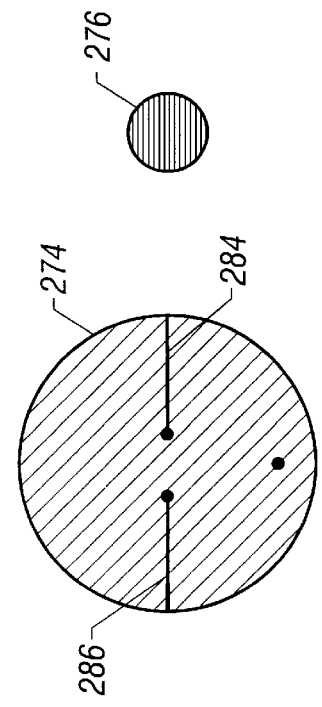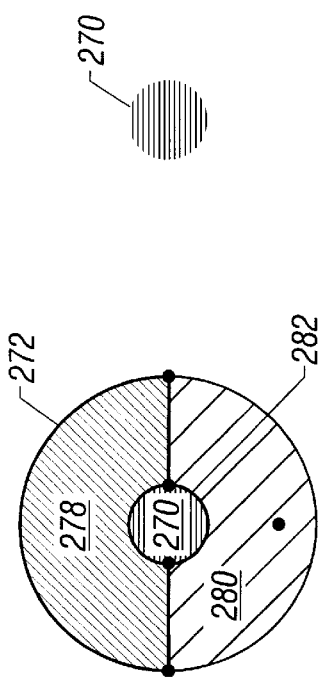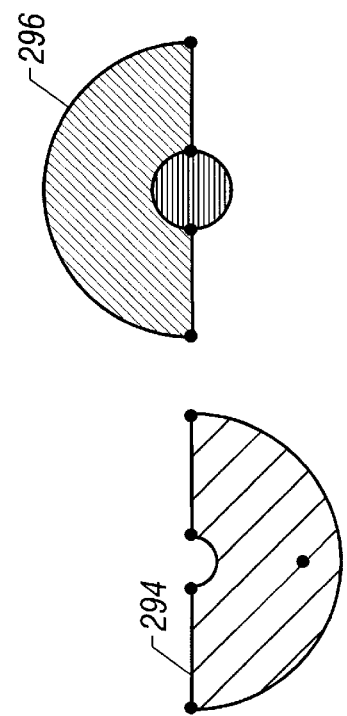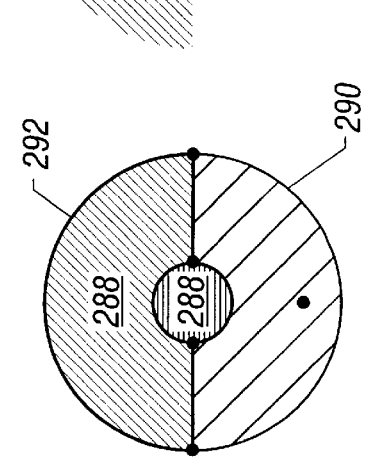
Figure 11D
Figure 11E

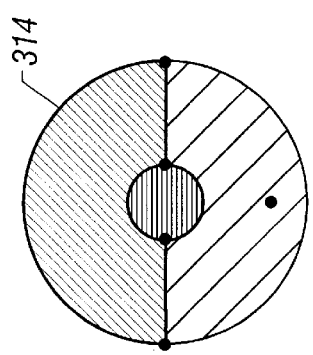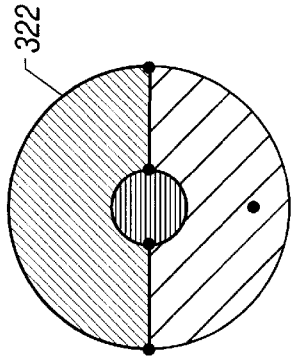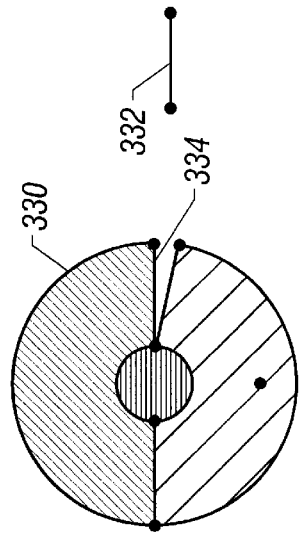
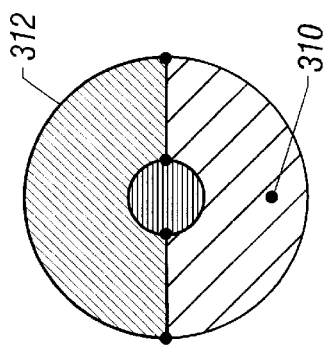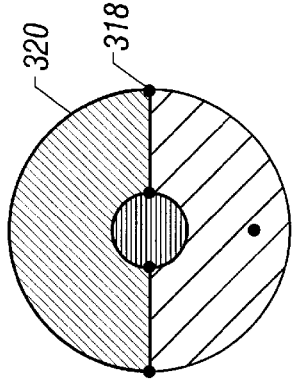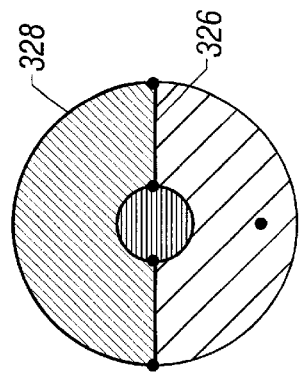
Figure 12A
Figure 12B
Figure 12C

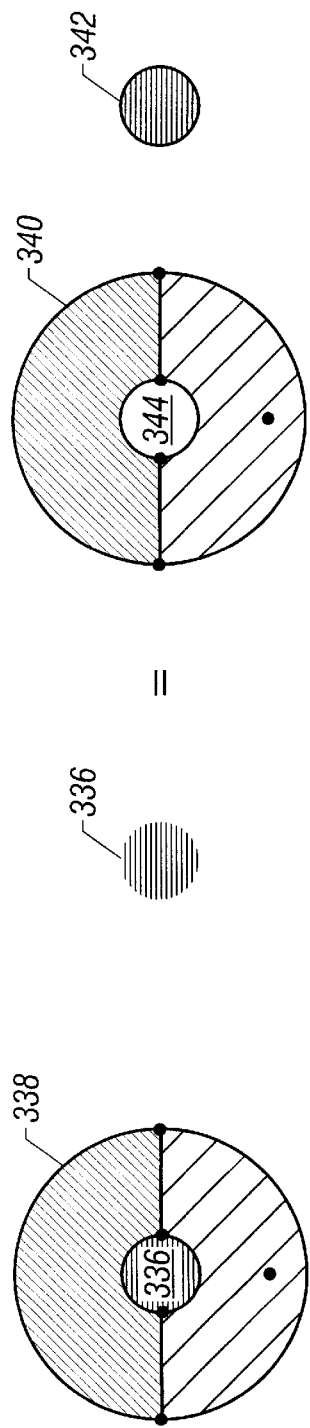
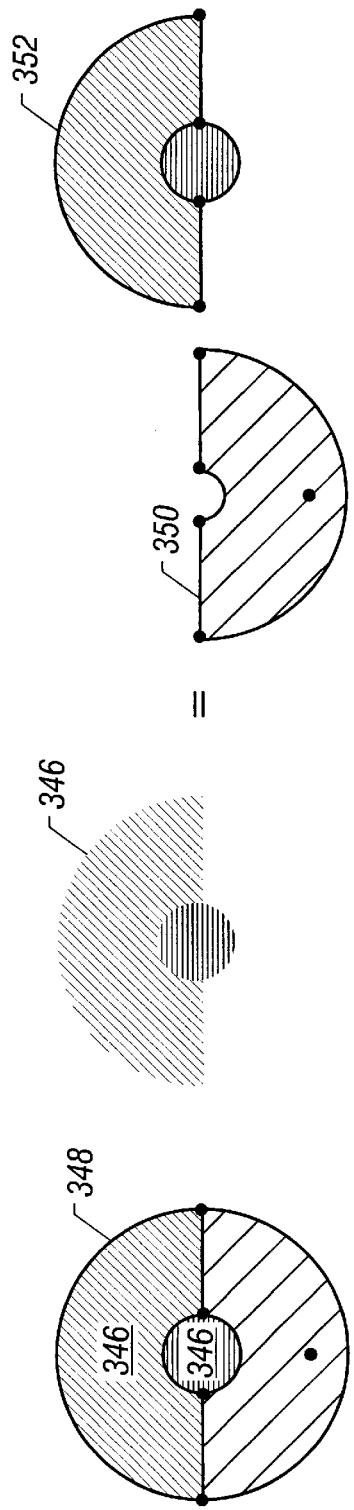
Figure 12D
Figure 12E

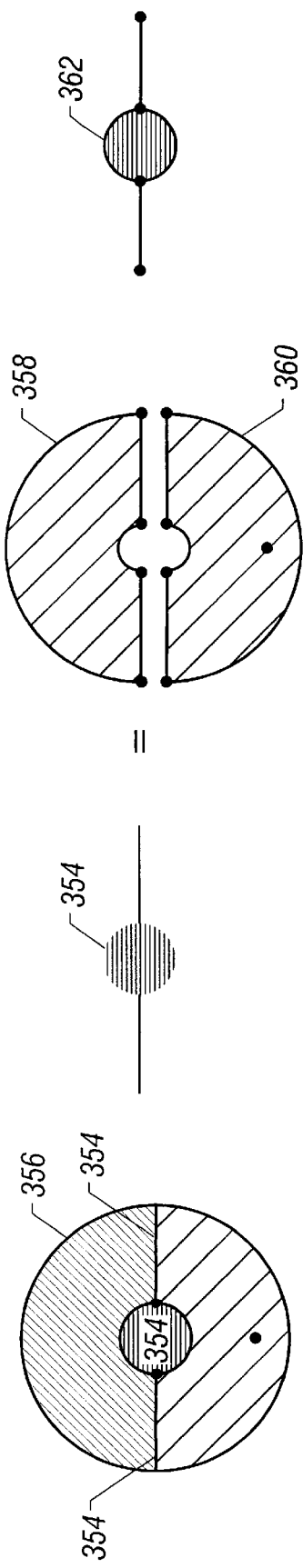
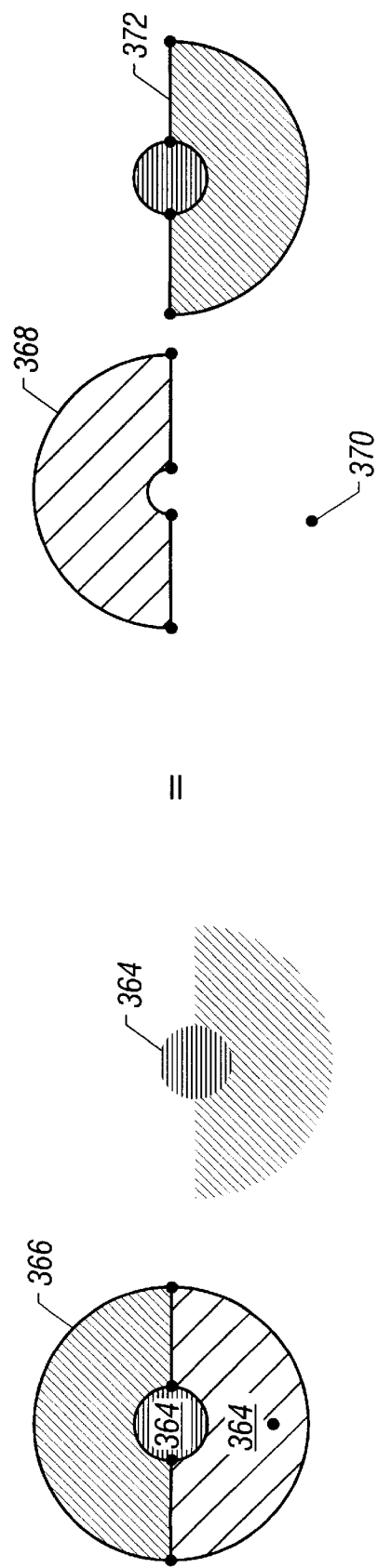
Figure 12F
Figure 12G

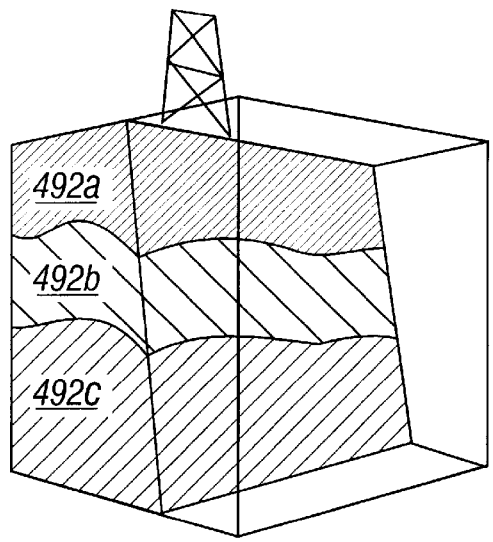
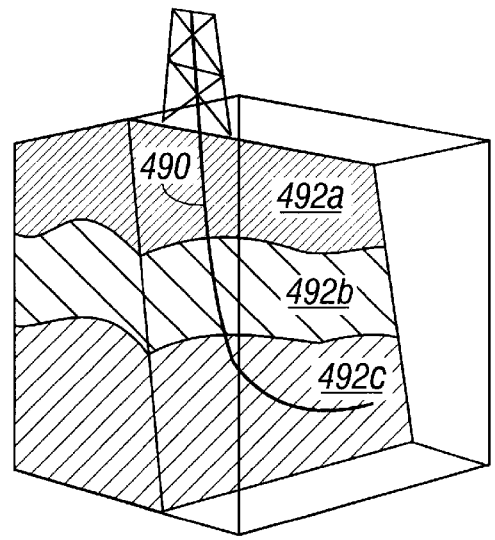
Figure 18A
Figure 18B
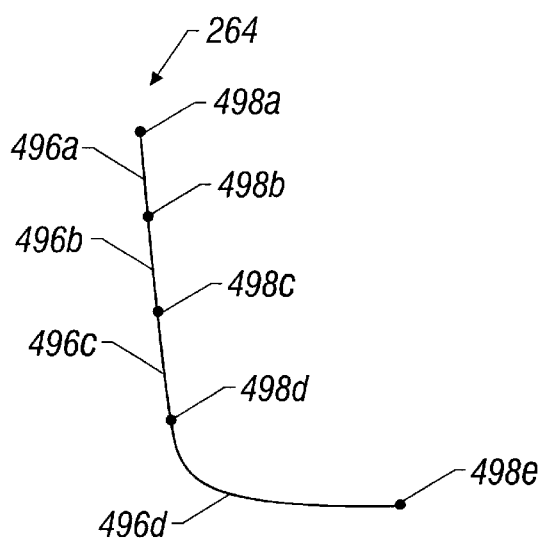
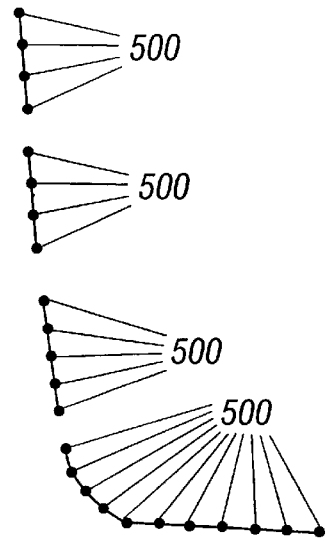
Figure 18C
Figure 18D

MODELING GEOLOGICAL STRUCTURES AND PROPERTIES

BACKGROUND

This invention relates to modeling geological structures and properties.

Geologists, geophysicists and petroleum engineers use models, including computerized models, of the earth's shell to plan exploration and production of hydrocarbons and, to a lesser extent, other minerals. As hydrocarbons become more and more scarce, the accuracy of the computerized models becomes increasingly important to limiting the cost of locating and producing hydrocarbons and the associated cost of hydrocarbon products, such as gasoline and heating oil.

Some of these models include databases of information about the subsurface of the earth. The databases exist in paper form, such as charts, graphs and tables, and in computerized form, such as data stored on tapes, magnetic disks, optical disks or other storage media. Frequently, these databases are organized to allow access to all of the information about each individual subsurface structure. For example, the name, well log, age, depth and other similar information for a particular subsurface structure is stored so that it can be retrieved as a group.

In the last few years, it became desirable for users of such data to be able to visualize the earth's subsurface. To accomplish this, the model stores topological data regarding the earth's subsurface which is used to build visual representations for analysis purposes. Generally, the existing databases are altered to allow the storage of topological information along with the other information.

SUMMARY

In general, in one aspect, the invention features a method for analyzing geological data stored on computer-readable media, comprising organizing the data to represent a plurality of sub-regions and a feature, and classifying the feature against a subset of the plurality of sub-regions.

Implementations of the invention may include one or more of the following. The dimension of the feature may be different from the dimension of the subset of sub-regions. Classifying may comprise subdividing a subset of the plurality of sub-regions by the feature, the dimension of the sub-regions in the subset being different from the dimension of the feature. Classifying may further comprise inserting the feature into a subset of the plurality of sub-regions. Classifying may also comprise inserting a feature into a subset of the plurality of sub-regions, a first portion of the feature falling within the subset and a second portion of the feature falling outside the subset, and trimming away the portion of the feature falling outside the subset.

In general, in another aspect, the invention features a method for analyzing geological data stored on computer-readable media, comprising organizing the data to represent a plurality of sub-regions, and editing the sub-regions.

Implementations of the invention may include one or more of the following. Editing may comprise cutting one of the plurality of sub-regions. The method may further comprise organizing the data to represent a feature falling within a subset of the plurality of sub-regions, wherein editing comprises dissociating the feature from the subset. The method may further comprise organizing the data to represent a feature falling within a subset of the plurality of sub-regions, wherein editing comprises extracting the feature from the subset.

In general, in another aspect, the invention features a method for analyzing geological data stored on computer-readable media, comprising organizing the data into a database, the database comprising a geometry part and a design part, the geometry part being separate from the design part.

Implementations of the invention may include one or more of the following. The design part of the database may comprise a description of the geometry part of the database. The design part may contain design data describing a feature, the geometry part may contain geometry data describing the feature; the method may further comprise extracting the design data from the design part by providing a name for the feature and extracting the geometry data from the geometry part by providing the name for the feature.

In general, in another aspect, the invention features a method for analyzing geological data stored on computer-readable media, comprising organizing the data to represent a plurality of sub-regions and a feature comprising a subset of the plurality of sub-regions, the feature having a shape corresponding to the aggregate shape of the subset of sub-regions; and preserving the shape of the feature during classification and editing.

Implementations of the invention may include one or more of the following. The shape of the feature may be modified if the shape of a sub-region in the subset is edited. The first feature may comprise a first sub-subset of sub-regions and a second sub-subset of sub-regions disconnected from the first sub-subset of sub-regions. The data may be organized to represent a second feature comprising a second subset of the plurality of sub-regions wherein the second subset of sub-regions overlaps the first subset of sub-regions. The second feature may be a sub-subset of the first feature. A material property may be attached to the first feature so that the material property applies to all sub-regions in the first subset of the plurality of sub-regions. The organizing may be accomplished interactively.

In general, in another aspect, the invention features a method for analyzing geological data stored on computer-readable media, comprising organizing the data to represent a region, and subdividing the region into a first sub-region and a second sub-region with a boundary at a first location.

Implementations of the invention may include one or more of the following. A bounded-from-above property and a bounded-from-below property may be attached to the boundary, the bounded-from-above property defining a first feature above the boundary, the bounded-from-below property defining a second feature below the boundary. The boundary may be dissociated from the region; and the region may be subdivided with the boundary at a new location, the region above the boundary being the first feature and the region below the boundary being the second feature. A material property may be attached to the boundary; and the material property may be evaluated as a boundary value problem using a value of the material property attached to the boundary.

In general, in another aspect, the invention features a method for analyzing geological data stored on computer-readable media, comprising organizing the data to represent a first plurality of sub-regions and a feature; attaching a material property to each sub-region in a subset of the first plurality of sub-regions; classifying the feature into the subset to produce a second plurality of sub-regions; and propagating the material property from the subset to the second plurality of sub-regions.

Implementations of the invention may include the following. The material property may be propagated from the feature to the second plurality of sub-regions.

In general, in another aspect, the invention features a method for analyzing geological data stored on computer-readable media, comprising organizing the data to represent a plurality of sub-regions; attaching a material property to each of the plurality of sub-regions; editing one sub-region of the plurality of sub-regions to produce a second plurality of sub-regions; and propagating the material property from the one sub-region of the plurality of sub-regions to the second plurality of sub-regions.

In general, in another aspect, the invention features a method for analyzing geological data stored on computer-readable media, comprising defining, in any order: a topology of a feature with respect to a plurality of sub-regions determined from the data; a material property for the feature; and a shape for the feature.

In general, in another aspect, the invention features a method for analyzing geological data stored on computer-readable media, comprising organizing the data into a feature; attaching to the feature a first plurality of properties; attaching to the feature a second plurality of properties; activating the second plurality of properties and deactivating the first plurality of properties.

In general, in another aspect, the invention features a computer system for analyzing geological data stored on computer-readable media, comprising means for organizing the data to represent a plurality of sub-regions and a feature; and means for classifying the feature into a subset of the plurality of sub-regions.

Implementations of the invention may include one or more of the following. The dimension of the feature may be different from the dimension of the subset of sub-regions. The classifying means may comprise means for subdividing a subset of the plurality of sub-regions by the feature, the dimension of the sub-regions in the subset being different from the dimension of the feature. The classifying means may comprise means for inserting the feature into a subset of the plurality of sub-regions. The classifying means may comprise means for inserting a feature into a subset of the plurality of sub-regions, a first portion of the feature falling within the subset and a second portion of the feature falling outside the subset, and means for trimming away the portion of the feature falling outside the subset.

In general, in another aspect, the invention features a computer system for analyzing geological data stored on computer-readable media, comprising means for organizing the data to represent a plurality of sub-regions; and means for editing the sub-regions.

Implementations of the invention may include one or more of the following. The editing means may comprise means for cutting one of the plurality of sub-regions. The computer system may comprise means for organizing the data to represent a feature falling within a subset of the plurality of sub-regions wherein the editing means comprises means for dissociating the feature from the subset. The computer system may comprise a means for organizing the data to represent a feature falling within a subset of the plurality of sub-regions wherein the editing means comprises means for extracting the feature from the subset.

In general, in another aspect, the invention features a computer system for analyzing geological data stored on computer-readable media, comprising means for organizing the data into a database, the database comprising a geometry part and a design part, the geometry part being separate from the design part.

Implementations of the invention may include one or more of the following. The design part of the database may comprise a description of the geometry part of the database. The design part may comprise design data describing a feature; the geometry part may comprise geometry data describing the feature; and the computer system may further comprise means for extracting the design data from the design part by providing a name for the feature; and means for extracting the geometry data from the geometry part by providing the name for the feature.

In general, in another aspect, the invention features a computer system for analyzing geological data stored on computer-readable media, comprising means for organizing the data to represent a plurality of sub-regions and a feature comprising a subset of the plurality of sub-regions, the feature having a shape corresponding to the aggregate shape of the subset of sub-regions; and means for preserving the shape of the feature during classification and editing.

Implementations of the invention may include one or more of the following. The computer system may comprise a means for modifying the shape of the feature if the shape of a sub-region in the subset is edited. The first feature may comprise a first sub-subset of sub-regions and a second sub-subset of sub-regions disconnected from the first sub-subset of sub-regions. The computer system may further comprise means for organizing the data to represent a second feature comprising a second subset of the plurality of sub-regions wherein the second subset of sub-regions overlaps the first subset of sub-regions. The second feature may be a sub-subset of the first feature. The computer system may further comprise means for attaching a material property to the first feature so that the material property applies to all sub-regions in the first subset of the plurality of sub-regions. The organizing may be accomplished interactively.

In general, in another aspect, the invention features a computer system for analyzing geological data stored on computer-readable media, comprising means for organizing the data to represent a region; and means for subdividing the region into a first sub-region and a second sub-region with a boundary at a first location.

Implementations of the invention may include one or more of the following. The computer system may further comprise means for attaching a bounded-from-above property and a bounded-from-below property to the boundary, the bounded-from-above property defining a first feature above the boundary, the bounded-from-below property defining a second feature below the boundary; means for dissociating the boundary from the region; and means for subdividing the region with the boundary at a new location, the region above the boundary being the first feature and the region below the boundary being the second feature. The computer system may further comprise means for attaching a material property to the boundary; and means for evaluating the material property as a boundary value problem using a value of the material property attached to the boundary.

In general, in another aspect, the invention features a computer system for analyzing geological data stored on computer-readable media, comprising means for organizing the data to represent a first plurality of sub-regions and a feature; means for attaching a material property to each sub-region in a subset of the first plurality of sub-regions; means for classifying the feature against the subset to produce a second plurality of sub-regions; and means for propagating the material property from the subset to the second plurality of sub-regions.

Implementations of the invention may include one or more of the following. The computer system may comprise a means for propagating the material property from the feature to the second plurality of sub-regions.

In general, in another aspect, the invention features a computer system for analyzing geological data stored on computer-readable media, comprising a means for organizing the data to represent a plurality of sub-regions; a means for attaching a material property to each of the plurality of sub-regions; a means for editing one sub-region of the plurality of sub-regions to produce a second plurality of sub-regions; and a means for propagating the material property from the one sub-region of the plurality of sub-regions to the second plurality of sub-regions.

In general, in another aspect, the invention may feature a computer system for analyzing geological data stored on computer-readable media, comprising a means for defining, in any order: a topology of a feature with respect to a plurality of sub-regions determined from the data; a material property for the feature; and a shape for the feature.

In general, in another aspect, the invention features a computer system for analyzing geological data stored on computer-readable media, comprising a means for organizing the data into a feature, a means for attaching to the feature a first plurality of properties; a means for attaching to the feature a second plurality of properties; a means for activating the second plurality of properties and deactivating the first plurality of properties.

In general, in another aspect, the invention features a computer program, residing on a computer-readable medium, comprising instructions for causing a computer to acquire geological data; organize the data to represent a plurality of sub-regions and a feature; and classify the feature into a subset of the plurality of sub-regions.

Implementations of the invention may include one or more of the following. The dimension of the feature may be different from the dimension of the subset of sub-regions. Classifying comprises instructions for causing the computer to subdivide a subset of the plurality of sub-regions by the feature, the dimension of the sub-regions in the subset being different from the dimension of the feature. Classifying may also comprise instructions for causing the computer to insert the feature into a subset of the plurality of sub-regions. Classifying may further comprise instructions for causing the computer to insert a feature into a subset of the plurality of sub-regions, a first portion of the feature falling within the subset and a second portion of the feature falling outside the subset, and trim away the portion of the feature falling outside the subset.

In general, in another aspect, the invention features a computer program, residing on a computer-readable medium, comprising instructions for causing a computer to acquire geological data; organize the data to represent a plurality of sub-regions; and edit the sub-regions.

Implementations of the invention may include one or more of the following. Editing comprises instructions for causing the computer to cut one of the plurality of sub-regions. The computer program may comprise instructions for causing the computer to organize the data to represent a feature falling within a subset of the plurality of sub-regions; and wherein editing comprises instructions for causing the computer to dissociate the feature from the subset. The computer program may further comprising instructions for causing the computer to organize the data to represent a feature falling within a subset of the plurality of sub-regions; and wherein editing comprises instructions for causing the computer to extract the feature from the subset.

In general, in another aspect, the invention features a computer program, residing on a computer-readable medium, comprising instructions for causing a computer to acquire geological data; and organize the data into a database, the database comprising a geometry part and a design part, the geometry part being separate from the design part.

Implementations of the invention may include one or more of the following. The design part of the database may comprise a description of the geometry part of the database. The design part may contain design data describing a feature; the geometry part may contain geometry data describing the feature; the method may further comprise instructions for causing the computer to extract the design data from the design part by providing a name for the feature; and extract the geometry data from the geometry part by providing the name for the feature.

In general, in another aspect, the invention features a computer program, residing on a computer-readable medium, comprising instructions for causing a computer to acquire geological data; organize the data to represent a plurality of sub-regions and a feature comprising a subset of the plurality of sub-regions, the feature having a shape corresponding to the aggregate shape of the subset of sub-regions; and preserve the shape of the feature during classification and editing.

Implementations of the invention may include one or more of the following. Instructions may be included for causing the computer to modify the shape of the feature if the shape of a sub-region in the subset is edited. The first feature may comprise a first sub-subset of sub-regions and a second sub-subset of sub-regions disconnected from the first sub-subset of sub-regions. The computer program may further comprise instructions for causing the computer to organize the data to represent a second feature comprising a second subset of the plurality of sub-regions wherein the second subset of sub-regions overlaps the first subset of sub-regions. The second feature may be a sub-subset of the first feature. The computer program may further comprise instructions for causing the computer to attach a material property to the first feature so that the material property applies to all sub-regions in the first subset of the plurality of sub-regions. The instructions for causing the computer to organize may operate interactively.

In general, in another aspect the invention features a computer program, residing on a computer-readable medium, comprising instructions for causing a computer to acquire geological data; organize the data to represent a region; and subdivide the region into a first sub-region and a second sub-region with a boundary at a first location.

Implementations of the invention may include one or more of the following. The computer program may further comprise instructions for causing the computer to attach a bounded-from-above property and a bounded-from-below property to the boundary, the bounded-from-above property defining a first feature above the boundary, the bounded-from-below property defining a second feature below the boundary; dissociate the boundary from the region; and subdivide the region with the boundary at a new location, the region above the boundary being the first feature and the region below the boundary being the second feature. The computer program may further comprise instructions for causing the computer to attach a material property to the boundary; and evaluate the material property as a boundary value problem using a value of the material property attached to the boundary.

In general, in another aspect, the invention features a computer program, residing on a computer-readable medium, comprising instructions for causing a computer to acquire geological data; organize the data to represent a first plurality of sub-regions and a feature; attach a material property to each sub-region in a subset of the first plurality of sub-regions; classify the feature against the subset to produce a second plurality of sub-regions; and propagate the material property from the subset to the second plurality of sub-regions.

Implementations of the invention may include the following. Instructions may be included for causing the computer to propagate the material property from the feature to the second plurality of sub-regions.

In general, in another aspect, the invention features a computer program, residing on a computer-readable medium, comprising instructions for causing a computer to acquire geological data; organize the data to represent a plurality of sub-regions; attach a material property to each of the plurality of sub-regions; edit one sub-region of the plurality of sub-regions to produce a second plurality of sub-regions; and propagate the material property from the one sub-region of the plurality of sub-regions to the second plurality of sub-regions.

In general, in another aspect, the invention features a computer program, residing on a computer-readable medium, comprising instructions for causing a computer to acquire geological data; and define, in any order: a topology of a feature with respect to a plurality of sub-regions determined from the data; a material property for the feature; and a shape for the feature.

In general, in another aspect, the invention features a computer program, residing on a computer-readable medium, comprising instructions for causing a computer to acquire geological data; organize the data into a feature; attach to the feature a first plurality of properties; attach to the feature a second plurality of properties; activate the second plurality of properties and deactivate the first plurality of properties.

DESCRIPTION

FIGS. 3, 4, 8a, 8c, 8e, 15a, 15c, 15e, 17b, 18c and 18d are examples of items to be modeled.

FIGS. 5, 8b, 8d, 8f, 9a–g, 10a–g, 11a–e, 12a–g, 13a–d, 14a, 14b, 14c, 15b, 15d, 15f, and 16b are representations of models.

FIGS. 6a, 6b, 6c, 7a, 7b, 16a, 17a, 17c, 17d, 18a and 18b are cross sections of items to be modeled.

Figure 1:
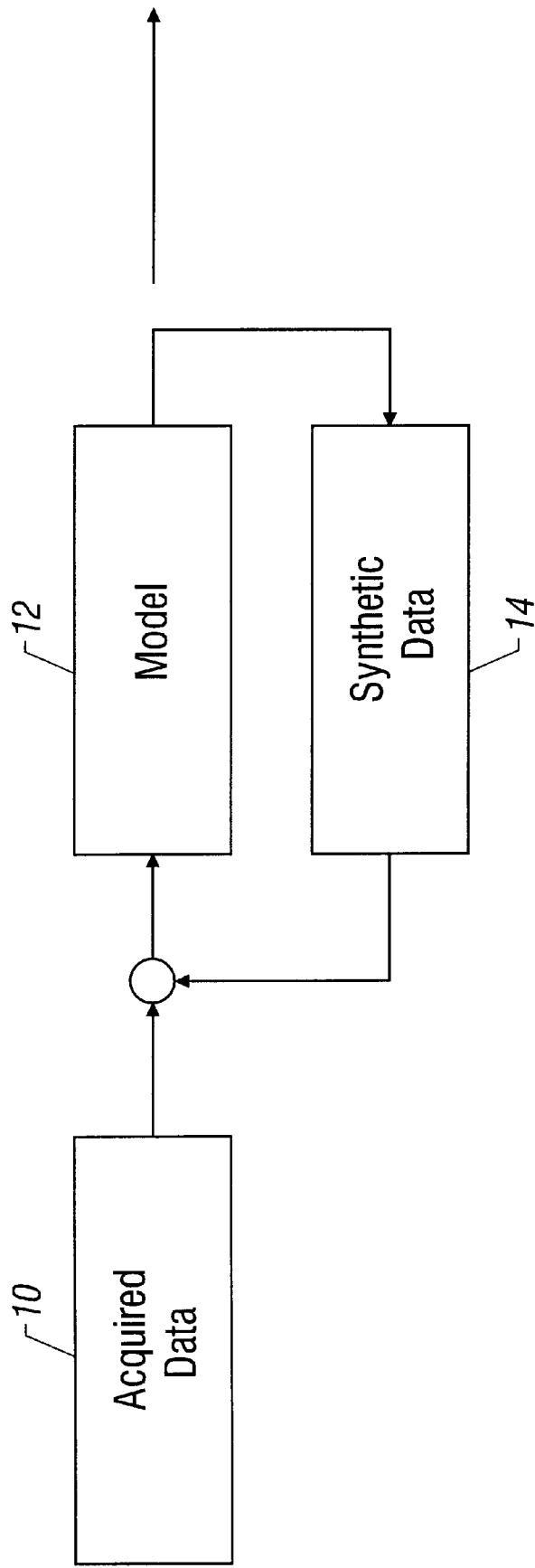
FIGS. 1 and 2 are block diagrams.

Simulation based interpretation ("SBI"), illustrated in FIG. 1, begins by gathering acquired data 10 from the geologic structures being modeled. The acquired data is interpreted and the resulting interpretation is captured as a model 12. The model is then tested by simulating the original acquisition experiment to produce simulated data 14. Differences between the simulated data 14 and the acquired data 10 are determined and used to adjust the model. Repeated iterations of these steps may cause the model to converge toward a consistent model in which the differences between the synthetic and the acquired data are reduced. Simulation Based Interpretation is described in U.S. patent application Ser. No. 08/770,290, entitled "Performing Geoscience Interpretation with Simulated Data", incorporated by reference.

The characteristics of the SBI model are defined by the simulation programs that use the SBI model as a source of simulation data. In the oil field, most acquisition experiments are based on field effects which are modeled with differential equations and simulated with finite element, finite difference, and ray tracing techniques. The inputs to these simulation techniques are properties of materials described by functions that vary throughout space. Moreover, the material properties have internal discontinuities that divide space into regions over which the material properties vary smoothly.

Figure 2:
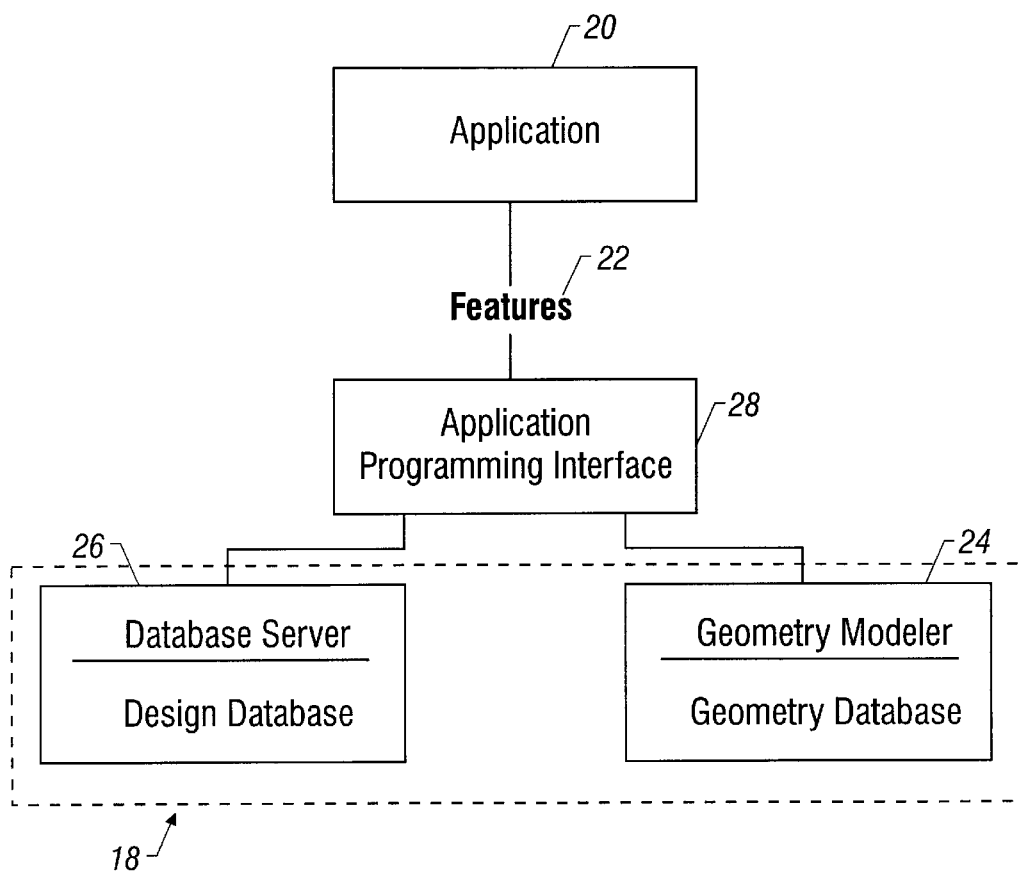

A geoscience model 18 is organized into two parts, where each part is maintained by its own database server as shown in FIG. 2. The application 20 allows the users, such as geologists, geophysicists and petroleum engineers, to construct and interact with the geoscience model using terms from those disciplines rather than terms from the science of mathematics. For example, the application allows the users to refer to horizons, faults, salt domes and other application entities. For each application entity, the application allows the users to interact with the geoscience model concerning a number of properties, including, for example, geometric properties such as (shape, size and location) and material properties (such as porosity, velocity and density). The combination of all of the properties associated with an application entity is called a feature 22.

The geoscience model contains two databases, or models, separated to optimize the technologies used to implement them. The first, called a geometry database or model (the database being a physical representation of the model) 24, may contain three principle kinds of information for each feature: a shape description of every feature, which is represented by sets of sub-regions and boundaries, a topology description specifying how the sub-regions and boundaries connect to another, and a description of the material properties within each subregion and on each boundary of the model. All geometric database data associated with a feature can be accessed knowing the feature's name. The geometry database works on a macro-topology basis. The geometry database may have a catalog of standard calls to an underlying database engine, which will allow it to interface with any commercially available database engines which compiles with the standard calls. An example of such a system is the SHAPES geometric modeling system by XOX Corporation, which provides a micro-topology. The geometry database may comprise an irregular space partition model.

The second database, called a design database or model 26, stores all data pertinent to a feature not stored in the geometry database. All design database data associated with a feature can be accessed knowing the feature's name. The Schlumberger Technology Corporation Data Model, which is implemented by Schlumberger's GEOFRAME® geoscience interpretation system, performs such a function.

The design database can be used as a stand-alone system by non-geometric applications. All data in the design database is in a system-specified format and is readable by any application using system services. Preferably, the system complies with the Petrotechnical Open Systems Consortium, ("POSC") requirement. An example of such a system is GEOFRAME®.

Geometric applications must be able to communicate with non-geometric applications, so material property and structural representations must be self-describing. A self-describing material property representation is one in which an application that had no part in the creation or modification of a geometric model can nevertheless review the properties associated with the model and evaluate any or all of those properties at any place in the geometric model. In the geoscience model, this is achieved by storing in the design database a description of the structural aspects of the geometry model, the properties that are represented in the geometry model and the results of any evaluations made of those properties. The self-describing information may include:

a. the existence and name of the geometry model;

b. the information required to load the geometry model;

c. the existence of a feature, identified by its unique name, which has a geometric representation of a geological entity defined in a design database;

d. the list of properties represented in the geometric model;

e. a description of the functions used to represent material property fields in the geometry model;

f. a description of each material property function's return value;

g. the property propagation rules used during edits of the geometry model; and h. a list of existing material property evaluations, including a description of the input parameters and output computed values for each evaluation.

The design database and the geometry database interact with an application programming interface 28, which interacts with the application. The application communicates with the two databases by referring to features making the division between the design and geometry databases transparent to this user. This allows a geometry database to be integrated with an existing design database without impacting the way applications are written and work.

The geometry database has a two level representation. The first, foundational, level is a cellular geometry representation comprising:

a. a set of geometric primitives called cells;

b. attributes attached to cells; and c. a graph of "connects" relationships, represented by cell bridges, among cells.

Cells are used to define boundaries and sub-regions in space. Cells can be points (zero dimensions), edges (one dimension), faces (two dimensions) and sub-volumes (three dimensions).

There are two kinds of cells: region cells and boundary cells. A cell can have as boundary cells: nothing (if the cell is a zero-dimensional point); two end points (if the cell is a one-dimensional edge); an outer perimeter and any number of inner perimeters (if the cell is a face); a surface outer perimeter and any number of surface inner perimeters (if the cell is a sub-volume). A single cell can act both as a boundary cell and a region cell. For example, a face can bound a sub-volume, but can itself be bounded by a set of curves.

Attributes include the shape of the cell and the value of varying material properties within shapes.

Users can associate, through the application, any kind of data with a feature as a feature attribute. Examples include the user-defined name, the two- or three-dimensional extent (area or volume), aggregate oil content, and many others. Attribute types are defined by the application builder and are bound to a particular feature and assigned values by an end-user at run time.

The graph of connects relationships between cells defines the interconnection (or topology) of cells. For example, a one-dimensional edge may be defined by the connection of two zero-dimensional points. Similarly, a two-dimensional face may be defined by the connection of three one-dimensional edges, forming a triangle, and a three-dimensional sub-volume may be defined by the connection of four two-dimensional faces, forming a tetrahedron. A cell bridge, also called a connect bridge, represents the cell-to-cell relationship and consists of one pointer to a cell of dimension n and another to a cell of dimension n-1 or less. For example, a cell bridge connects the zero-dimensional end point of a line to the line.

The second level of the geometric database, the apex, is the feature representation comprising a set of features and a graph of "contains" relationships among features and between features and cells. A set "A" contains a set "B" when every element of B is an element of A. In a geological example, a feature (as a set) may contain a horizon (another feature) and may be divided into a group of cells. In this example, the feature as a set contains all the points that make up the horizon as a set, so it is correct to say that the feature contains the horizon.

A feature bridge, also known as a contains bridge, represents the feature-cell contains relationship and consists of pointers to one feature and to one cell or to one feature that contains another feature.

Figure 3:
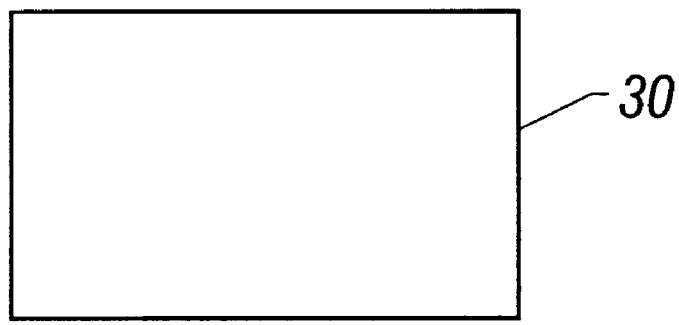
Figure 4:
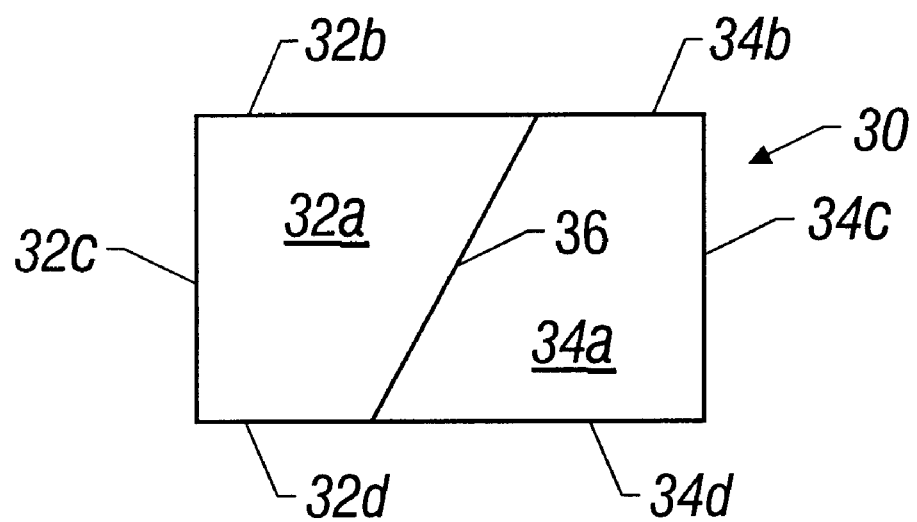

The two level nature of the geometric database is evident when the contains relationship graph and the connects relationship graph are shown in the same figure, as will be illustrated with a simple example. An example of a simple feature is a box 30, as shown in FIG. 3. The box 30 can be divided into two cells, 32a, 34a, with the addition of a curve 36, as shown in FIG. 4. Cells 32a and 34a, two-dimensional faces, are each bounded by four two-dimensional cells 32b, 32c, 32d, 36 and 34b, 34c, 34d, 36, respectively.

Figure 5:
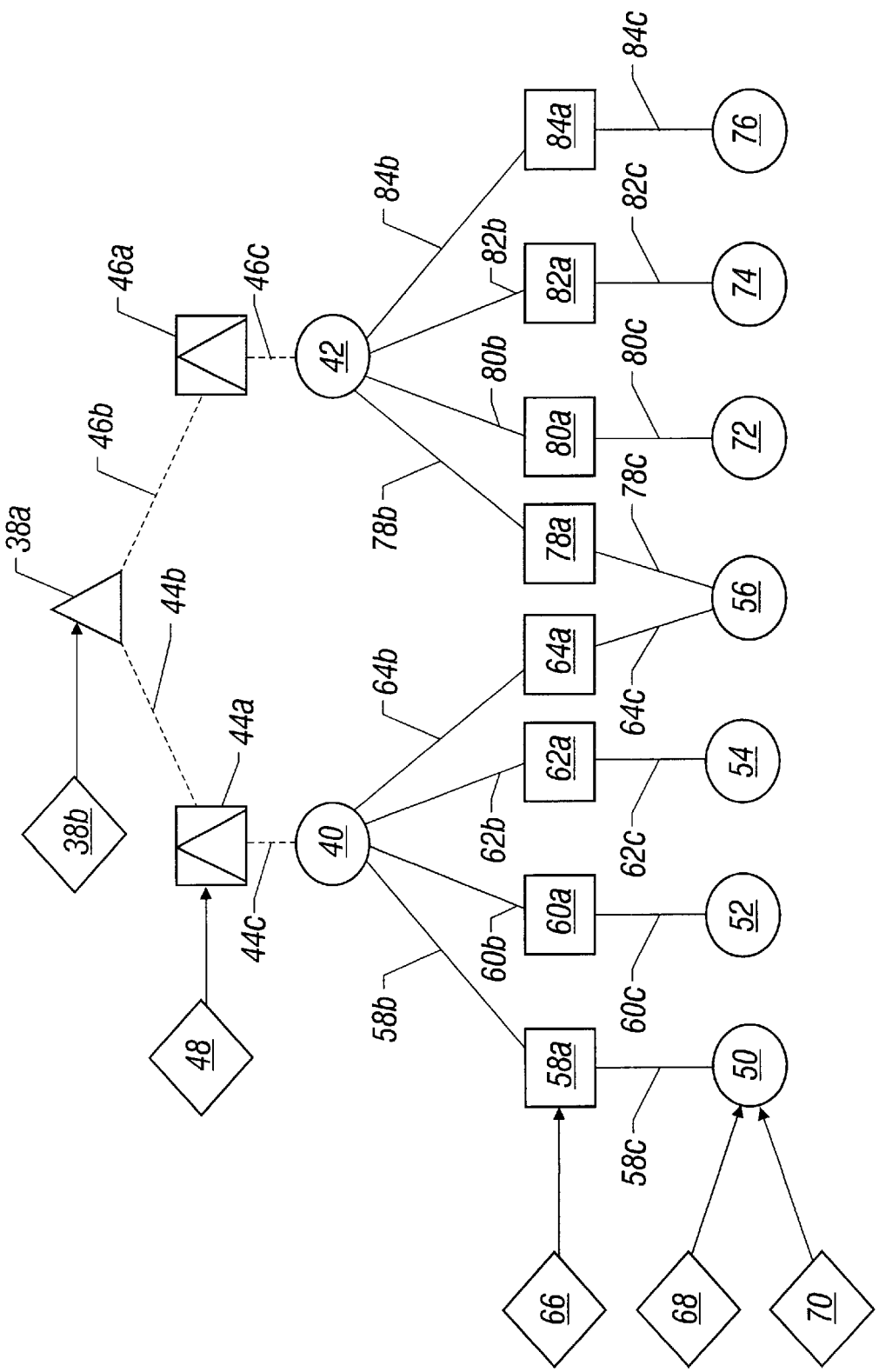

With these relationships defined, the contains relationship graph and the connects relationship graph can be drawn, as shown in FIG. 5. In graphs such as that shown in FIG. 5, triangles represent features, diamonds represent attributes, triangles enclosed by squares represent feature bridges, circles represent cells, and squares represent cell bridges. Feature 30, represented by triangle 38a, appears at the apex of the graph. A feature attribute, represented by diamond 38b, is attached to the feature, as is indicated by the arrow from the feature attribute to the feature.

The contains and connects relationship can be represented on the same topological graph, as shown in FIG. 5. The box feature 30 contains the two face cells 32a, 34a, represented by circles 40 and 42. The contains relationship is established by feature bridges, represented by squares with triangles inside 44a, 46a. The pointers of the feature bridges are represented by dashed arcs 44b, 44c, 46b and 46c.

Heuristically, a feature bridge gives a context for a property. As an example, suppose that a cell "C" is in two features, "F1" and "F2". Suppose it is desired to assign a color property to cell C whose value is context-dependent, namely whether the context is F1, the context is F2, or neither. For concreteness, suppose that in context F1, C's color is blue and in context F2, C's color is green and in the nil context (neither F1 or F2), C's color is red. Then it is necessary to provide a place to hold the color value that depends on which of the three contexts is specified. In this case, the feature bridge joining F1 to C holds the value "blue"; the feature bridge joining F2 to C holds the value "green"; and finally, if neither F1 or F2 is specified as a context, then the cell itself holds the value "red". Any or all context values can be omitted; i.e., it is not necessary to have a value for a property attached to a feature bridge. As an example of a feature bridge, cell 40 has a property 48 attached to feature bridge 44a. Property 48 provides the value of that property for cell 40 in the context of feature 38a. If cell 40 were contained within a second feature through a second feature bridge (not shown), the value of the property for cell 40 in the context of that other feature would be the value of the property attached to the second feature bridge.

Proceeding with the description of FIG. 5, the two-dimensional face cell 32*a*, represented by circle 40, is connected to one-dimensional boundary cells 32*b*, 32*c*, 32*d* and 36, represented by circles 50, 52, 54 and 56. The connects relationships are established by cell bridges 58*a*, 60*a*, 62*a* and 64*a*. The pointers of the connect bridges are represented by the solid lines 58*b*, 58*c*, 60*b*, 60*c*, 62*b*, 62*c*, 64*b* and 64*c*. Boundary material property 66 is associated with cell bridge 58*a* and defines a material property when cell 50 is viewed as a boundary. Region material property 68 is associated with cell 50 and defines a material property when cell 50 is viewed as a region. Shape attribute 70 is associated with cell 50 and defines the shape of cell 50.

Similarly, the two-dimensional face cell 34*a*, represented by circle 42, is connected to one-dimensional cells 34*b*, 34*c*, 34*d* and 36, represented by circles 72, 74, 76 and 56, respectively. The connects relationships are established by cell bridges 78*a*, 80*a*, 82*a* and 84*a*. The pointers of the connect bridges are represented by the solid lines 78*b*, 78*c*, 80*b*, 80*c*, 82*b*, 82*c*, 84*b* and 84*c*. Boundary property attributes, not shown, may be associated with cell bridges 78*a*, 80*a*, 82*a* and 84*a*. Regional material property attributes, not shown, may be associated with each cell 56, 72, 74 and 76.

Another layer of the connects relationship graph, illustrating the connection of the one-dimensional cells to the zero-dimensional cells, is not shown. It is similar to the portion of the connects relationship graph just discussed.

Figure 6A:
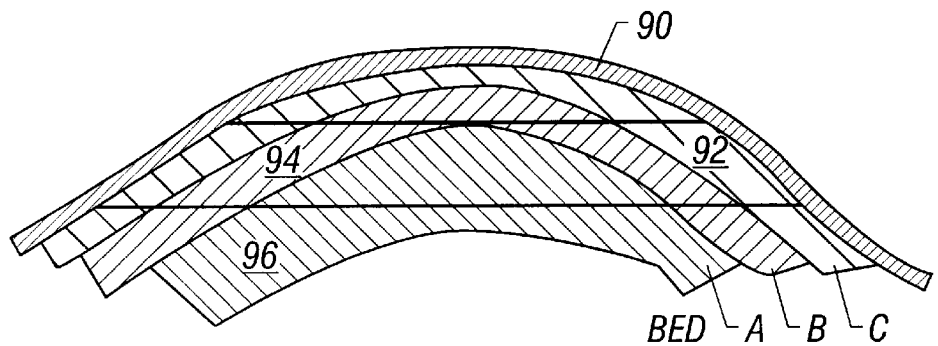
Figure 6B:
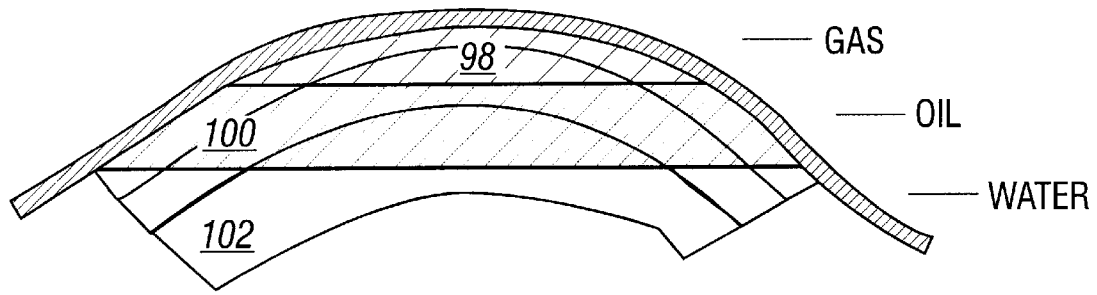
Figure 6C:
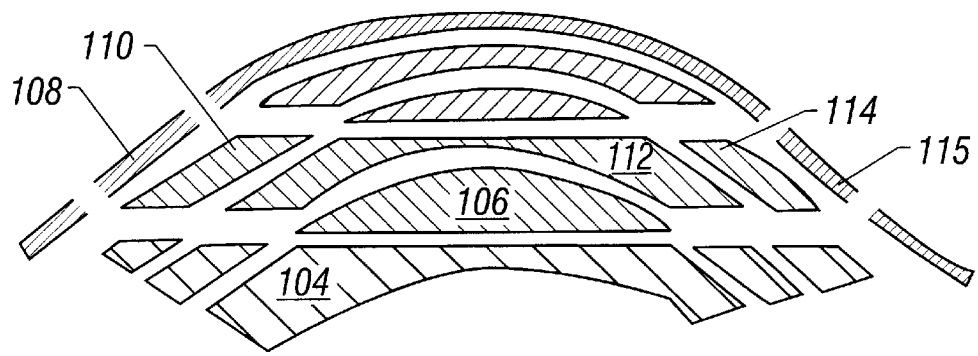

The relationship of features and cells in a geological environment is illustrated in FIGS. 6*a*, 6*b* and 6*c*. A series of geological strata, shown in FIG. 6*a*, comprises a cap rock 90 and three permeable beds 92, 94, 96. The cap rock and each of the permeable beds is a feature.

The cap rock is impermeable to fluids and acts as a trap for fluids that otherwise tend to migrate upward. Such fluids flow through the permeable beds. Gas, oil and water fluids accumulate and separate into distinct layers, as shown in FIG. 6*b*. The three permeable beds bounded by the cap rock create a gas reservoir 98, a oil reservoir 100 and a water reservoir 102. Each of these reservoirs is a feature.

The geological strata features 90, 92, 94 and 96 overlap the reservoir features 98, 100 and 102, as can be seen in FIGS. 6*a* and 6*b*. The geoscience model may partition the volume by creating a cell for each intersection of features, as shown in FIG. 6*c*.

A feature's shape is represented by a collection of cells, as shown in FIG. 6*c*. The collection of cells is called the feature's "cell list". For example, the cell list for the lowest permeable bed feature 96 comprises two cells 104 and 106. The cell list for the oil reservoir feature 100 comprises six cells 106, 108, 110, 112, 114 and 115. The lowest permeable bed feature 96 and the oil reservoir feature 100 share one cell 106.

Figure 7A:
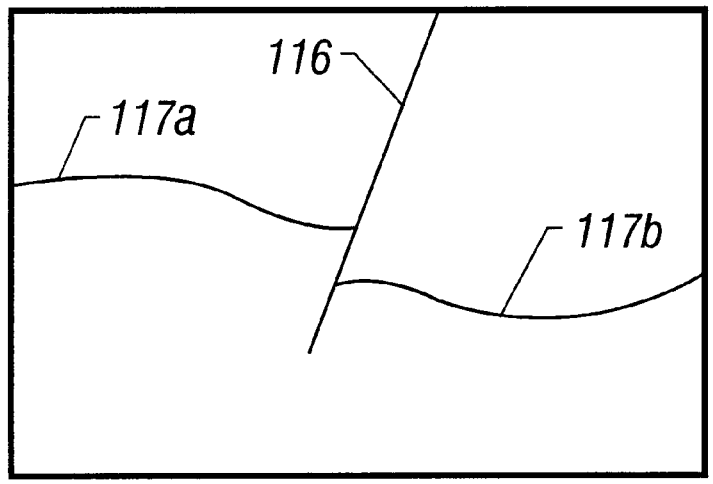
Figure 7B:
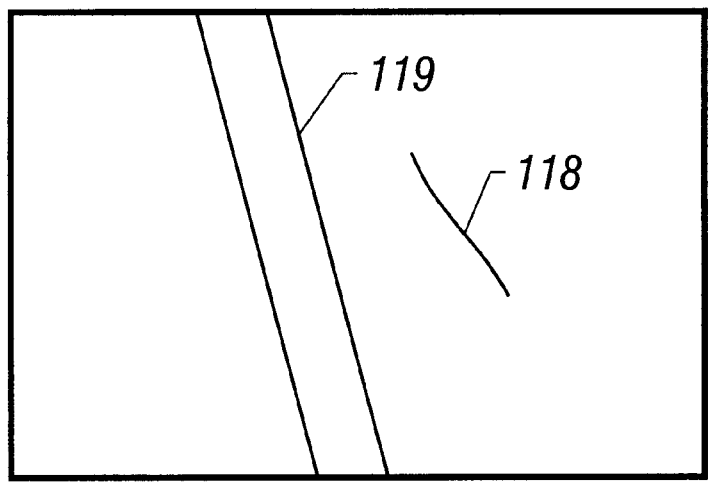

As shown in FIG. 7*a*, the cells in a feature may be topologically disconnected, e.g., a horizon which has been faulted 116 into two disconnected surface elements, 117*a*, 117*b*. They may also be of mixed dimensions, e.g., one-dimensional or two-dimensional. As another example, shown in FIG. 7*b*, a crack 118 may be geometrically represented as a surface in a volume next to a borehole 119 such that the crack does not separate the volume into two distinct subvolumes. Any single cell, such as cell 106 in FIG. 6*c*, may be contained by any number of features making it possible to represent over-lapping feature shapes. While one feature may overlap another, a single feature may not overlap itself.

The shape of a feature can be edited by adding and removing cells from the feature's cell list or by editing the shape of one of its constituent cells.

A feature's cell list may also contain other features so that a hierarchical tree of cells can be built by the application. Features with no cells in their cell list can be created at any time and updated by the end-user so that applications can be built which can define application objects, the application object's geometry, and material properties in any order.

A cell can be "active" or "inactive". An active cell is part of the geometry model's topology while an inactive cell is not. A cell may be contained by a feature and be inactive. An active cell contained by a feature may be deactivated. In that case, the feature continues to contain the cell but the cell is no longer part of the topology.

Similarly, a feature can be either active or inactive. A feature becomes active through classification, described below, or through explicit identifications of a group of cells as a feature. Features become inactive through the model editing services described below. When a feature is deactivated, it does not participate in subsequent topological classifications, but all material property representations based on the inactive feature remain intact. This property of features allows "versions" of features to be retained.

A feature may be copied, and the properties of the copy may be modified or replaced. Then, either the original feature or its copy may be incorporated in the model; the alternative versions of the feature are retained as inactive features. Thus, the model can retain multiple versions of the representation of a particular feature. By way of illustration, consider a geological formation consisting of one crack and one fault such that there is one alternate for the crack and two versions of the fault. The active version of the feature could have one representation of the crack and the fault. The inactive version could have a second representation.

Versions can be used to account for erosion, as well. The erosion of a feature, such as an exposed bed, can be represented by eliminating one or more cells from the feature. If the non-eroded feature is retained as an alternative representation, the erosion can be "undone" simply by selecting the non-eroded representation of the feature.

The internal boundary between two adjoining cells (cell 36 in FIG. 4, for example) is called a "seam" while an external boundary (such as cell 32*b*) is called a "limit". Feature 30's cell list does not include cell 36, which is a seam. In features, such as feature 30, which do not contain the cellular seam, the two neighboring cells contained within the feature's cell list are treated in the feature as if there were no boundary. Adding the boundary cell to the feature's contain list adds the seam to the feature's shape.

Any boundary of a cell in a feature's cell list acting as a limit boundary to the feature is automatically considered a part of the feature's shape. For example, in FIGS. 3 and 4, boundary cells 32*b*, 32*c*, 32*d*, 34*b*, 34*c*, and 34*d* are part of the shape of feature 30, even though they are not explicitly included in feature 30's cell list.

A geometry model property is an attribute attached to a topological entity, such as a feature, cell, feature bridge or cell bridge, in the geometry model. Material properties, mentioned above, are examples of geometry model properties. Porosity, permeability and the velocity of sound are examples of material properties.

When a material property is represented in the geometry model, its value may be defined over the entire space of the geometry model, although it is acceptable to have no value in certain regions. The values of material properties vary as a function of location within the model space and are represented by functions called "property evaluators". A discontinuity is represented explicitly by a boundary placed in the geometry model which creates additional sub-regions. Different property evaluators are associated with each sub-region.

Thus, the geometric structure of the geometry model partitions the model space into a set of sub-regions, each of which is used as the valid domain for a function that computes material property values. Everywhere in the model the representation of a material property (in terms of its name, units, dimension and machine storage) will be the same, but its variation in space may be represented by a different function within each sub-region.

In addition to the property evaluator, a material property representation may include a family of related evaluators, such as gradients, directional derivatives, tangents, curls, and other similar mathematical functions.

A material property may be attached to any topological entity within a geometry model, including features, feature bridges, cells and cell bridges. The topological entity to which a property is attached is called its "attachment site."

As stated earlier, a material property may be evaluated at any location in the geometry model. The evaluation is performed in three phases. First, the user identifies a point location in space and a topological entity (cell, cell bridge, feature or feature bridge and, optionally, a preferred direction to resolve ambiguities at boundaries). The geoscience model classifies the point location against the geometry model to find the lowest dimensional cell which contains the point location. That cell is used to select a cell bridge or feature bridge if directed by the user.

Second, the system determines if the located cell, cell bridge or feature bridge has a representation for the material property being evaluated. If not, the system invokes an "inheritance" scheme to find a higher-dimensional cell or a containing feature which contains the necessary property representation:
  (a) if the topological entity missing the material property is a cell bridge, the cell bridge's associated boundary cell is used;
  (b) if the topological entity is a boundary cell, then the associated sub-region cell is used;
    (1) the system will use the preferred direction to choose from among more than one sub-region if the boundary cell bounds more than one sub-region;
  (c) if the topological entity is a feature bridge, then the associated feature is used; and
  (d) if the topological entity is a cell or feature contained by exactly one other feature, then the containing feature is used.

If an attachment point for the material property is still not found then the user is notified by way of an error message.

Third, once the material property's attachment site is located, the property evaluator is extracted and evaluated at the requested location. If the material property evaluator is in the form of a differential equation, it will be necessary to evaluate the attachment site's boundaries as well in order to arrive at a unique solution.

As stated above, a material property representation consists of a family of evaluators. Each evaluator computes a different characteristic of the property, such as its gradient or its directional derivative. Each evaluator is implemented as a user-specified function whose input and output definition complies with the design database specification. At an attachment site, at most one function can be used in a property representation. Different attachment sites may use different functions for the same property. For example, in one sub-region, a material property may be a constant, while in another the property may vary linearly.

A property evaluator is a self-describing function so that any application can evaluate a material property in a geometry model constructed by any other application. This is accomplished by requiring property evaluators to have the following characteristics:
  a. Evaluator functions are represented by programming language (e.g. "C") procedures which have:
    1. A standard call signature (i.e., an agreed upon list of inputs and outputs and ordering of same) for each evaluator class, which is independent of the property being represented;
    2. A common return value type (e.g., integer, real, array) for each property, which is documented in the design database, there being no restrictions regarding the amount or kind of data returned and evaluators for different properties being allowed to return different amounts and kinds of data;
    3. A permanent and recoverable connection between the procedure's name and its object code to enable the reading and writing of the geometry model itself and of its material properties.
  b. An evaluator function may have a parameter block, stored in the geometry database and described in the design database, which may be used to specialize a general function (such as coefficients for a polynomial) or to represent the function by a table whose file name is stored as one of the parameters in the parameter block, the use of parameters being defined by the implementor of the evaluator function; and
  c. Property representations may contain evaluator functions for the following property characteristics:
    1. differential evaluators (tangent, normal, curvature, frenet-frame, bi-normal, etc.) for lower-dimensional functions embedded into higher-dimensional spaces;
    2. parametric derivatives (e.g., Jacobian) for parametric functions; and
    3. the potential function for a conservative vector field whose divergence is the represented function which can be used to simplify the computation of volume integrals of the represented function.

Property evaluators are commonly implemented as parametric functions. If material property shape is described using the same functions that describe structural shape, then the application can look at the intersection of structure and material property to infer the correlation between material property and shape.

The geoscience model computes volume integrals of a property if the function representing the property satisfies the Divergence Theorem as shown in equation 1:

$$\text{If } P = \nabla \cdot Q, \text{ then } \int_V (\nabla \cdot Q) dV = \int_S (Q \cdot n) dS \quad (1)$$

where
  P = a smooth property scalar function
  Q = a smooth vector function
  V = volume of interest
  S = boundary of V
  n = normal vector to S The property evaluator function is P. Whenever the property evaluator implementor can supply a vector function Q whose divergence is P, then the volume integral of P can be computed as a surface integral of Q. The surface integral is computed by approximating the original boundary by a preferably triangular surface over which the surface integral can be easily computed. This approach, when applicable, converts a three-dimensional volume computation into a two-dimensional computation over a triangulated surface which has the potential of reducing the computation time considerably.

Each property represented in a geometry model has a property template kept in the design database which describes the property, its property evaluators, and a set of event driven callbacks associated with the property. The template contains all the information needed to save and restore property representations kept in the geometry database. When the geometry database is restoring a specific model, the loading process (i.e., loading from disk files into memory) queries each attachment site for any material properties it possesses. The site can respond that it has none. If it has a material property, then the site gives enough information so that the loading process can reconstitute the site's material property. The geoscience model ensures that all of the property's functions are properly bound and labeled (i.e., ensures that all of the property evaluator functions can be accessed) and that the property's parameter block is properly saved or restored. The parameter template causes the property to be self describing. The geometry database is dependent on the information in the design database for saving and restoring.

Saving material properties is the reverse of restoring them. When the saving process encounters an attachment site that has properties, it notes what functions have been specified as part of the property evaluator and puts at the attachment site enough information so that when the model is restored, as described above, the evaluator can be reactivated.

The property template for a property may contain the following information:
  a. a design database identifier for the represented property;
  b. a list of material property evaluators;
  c. a specification for each material property evaluator's parameter block;
  d. a specification of the return value type for each function in the evaluator including a description of type and quantity of data returned (for example, the material property evaluator for porosity may return a double precision scalar, but the material property evaluator for the gradient of porosity may return a three-dimensional vector of double precision numbers, or the return type can be an ASCII string); and
  e. a list of event callbacks which are independent of attachment site and have standard call signatures.

Event callbacks are used to manage change to the properties. As discussed above, properties are attached to entities in the topology graph. The system signals events as it operates on the topology graph. The application registers a callback to be invoked by the system for each event. A ready event initializes properties when the model is opened. A save event makes properties persistent. A property propagation event defines property propagation when the geometry model is modified.

The geoscience model allows end-users to build and edit geometry models without losing any shape or material property information.

Geoscience model functions which create a geometry primitive shape return a feature containing a single cell. Features can be created which contain no cells and individual cells can be added or removed from a feature's cell list. The shape of the feature is inherited from the cells it contains and so changing the cells on the feature's cell list or editing the shape of a cell in a feature changes the shape of the feature.

The topological relationships within a geometry model can be used to identify sets of cells in a geometry model that can be turned into new features. For example, features can be made from the boundaries of an existing feature, or from the neighbors of an existing feature. Features can also be created as Boolean combinations (union, subtract, and intersect) of existing features within a single geometry model. When used this way, the Boolean operators do not modify the cellular part of the geometry model.

Geometry models are built and edited with the "classify" or "classification" commands, which combine two cellular models into one, and the "model editing" commands, which split a single cellular model into two or more. The classify and model editing commands edit the topology and modify the cells but do not edit the cell shapes. As side effects, the cells in the cellular model are changed by merging, splitting, and embedding. For example, adding a fault to a model that has one horizon might cut the horizon, if there is an overlap, or it might not. If there is an overlap, then the two surfaces are intersected which may split cells that form the horizon and cells that form the fault.

Two sub-region cells are merged into one whenever an intervening boundary cell is removed. One cell is split into two whenever a boundary cell is added that splits a sub-region cell. Two cells are embedded into one whenever two sub-region cells from different models are overlaid with one another. Two cells may not overlap one another. If two cells are created which do overlap, the system embeds the two cells, replacing the original two cells with a new cell created from the overlap.

The classify commands preserve the shapes of existing features while modifying the topology of the cellular model by automatically editing the feature cell lists as the cells are split and embedded. Whenever a cell is split into two, its occurrence in all feature lists is replaced by the two resulting cells. Whenever two cells are embedded into one, their occurrences in all feature lists are replaced by the resulting cell.

Preserving feature shape for cells being merged is slightly more complicated than for the embedded and split cases. If all features that contain either of the cells to be merged also contain the other cell to be merged then the merge is executed and the pair of cell references is replaced with a reference to the resulting cell. If one or more of the features contain only one of the cells then the merge is not executed and a copy of the boundary being removed is placed back in the model. Leaving the boundary in the model guarantees that the shapes of the existing features remain unchanged but does not prohibit the construction of a feature without the boundary.

The feature cell lists are updated with an event driven callback mechanism for attribute propagation. Whenever a cell is split, merged, or embedded, a callback subroutine is executed for every feature which contains the affected cells. The subroutine is provided with a description of the event, pointers to the input and output cells, and to the feature. Feature cell list editing functions are used to make the needed changes.

Figure 8A:
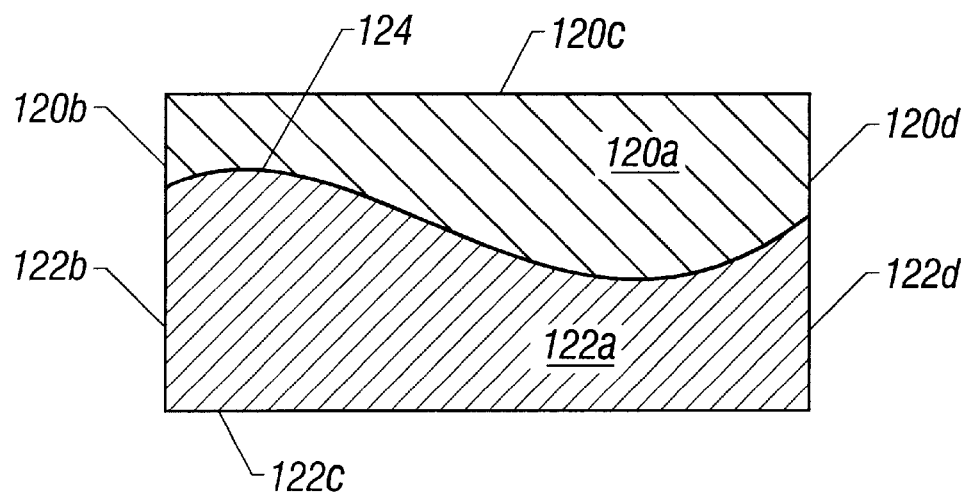

Merging and splitting cells is illustrated in FIGS. 8a–8f. The original geometry model is two sub-regions 120a, 122a with a boundary 124 between them, as shown in FIG. 8a.

Sub-region 120a is bounded by one-dimensional cells 120b, 120c, 120d, and 124. Sub-region 122a is bounded by one-dimensional cells 122b, 122c, 122d, and 124.

Figure 8B:
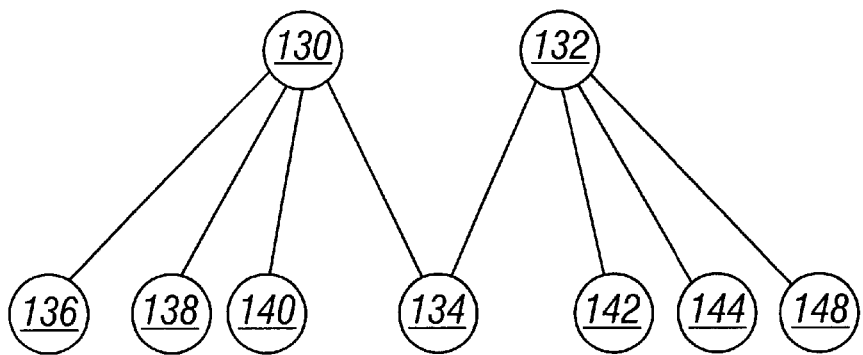

The topology graph for the original geometry model system in FIG. 8a is illustrated in FIG. 8b. Circle 130 represents sub-region 120a and circle 132 represents subregion 122a. Circle 134 represents boundary 124 and circles 136, 138, 140, 142, 144, 148 represent cells 120b, 120c, 120d, 122b, 122c, and 122d, respectively. For simplicity, only two-dimensional and one-dimensional cells have been illustrated and the zero-dimensional cells and cell bridges have not been shown. There are no features shown in this model. As can be seen from the topology graph, cell 120a is connected to cells 120b, 120c, 120d and 124, and cell 122a is connected to cells 122b, 122c, 122d and 124.

Figure 8C:
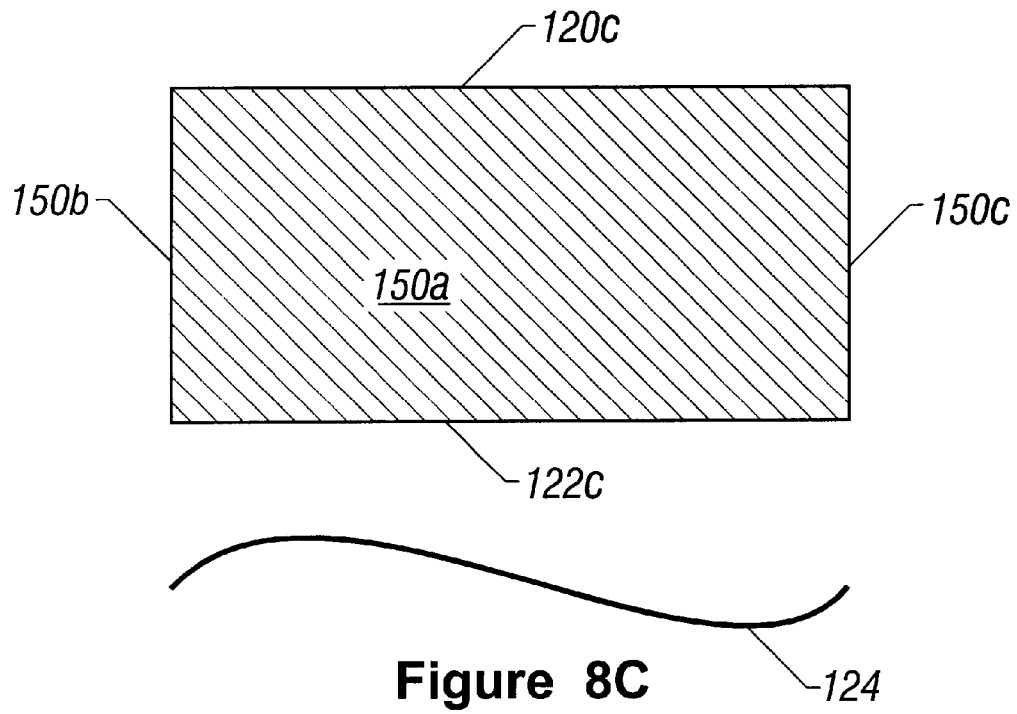

Assuming the user decides to edit the topology graph by moving boundary 124, the first step is to remove the boundary, as is shown in FIG. 8c, and merge cells 120a and 122a into cell, 150a. The geoscience model automatically creates new cells to bound the new cell 150a: 150b, 150c, 120c and 122c, the last two remaining unchanged from the original. Cell 150b is created by merging cells 120b and 122b and 150c is created by merging cells 120d and 122d. The boundary 124 is no longer connected to any other cell.

Figure 8D:
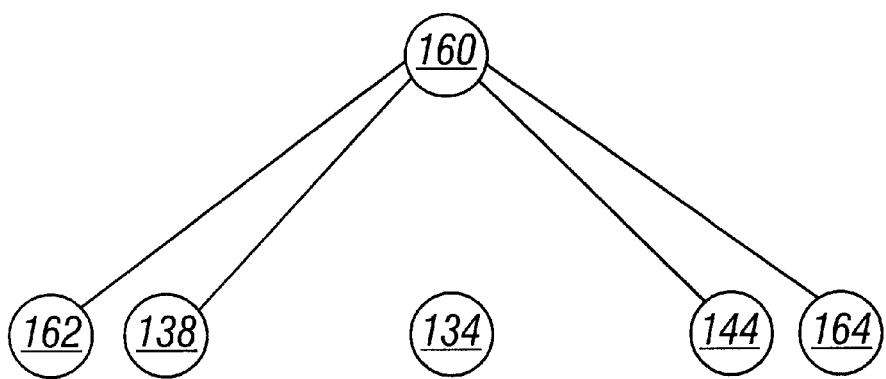

These relationships are illustrated in the topology graph of FIG. 8d. Sub-region 150a, represented by circle 160, is connected to cells 150b, 150c, 120c and 122c, represented by circles 162, 164, 138, and 144, respectively. Cell 124, represented by circle 134, is not connected to any other cell.

Figure 8E:
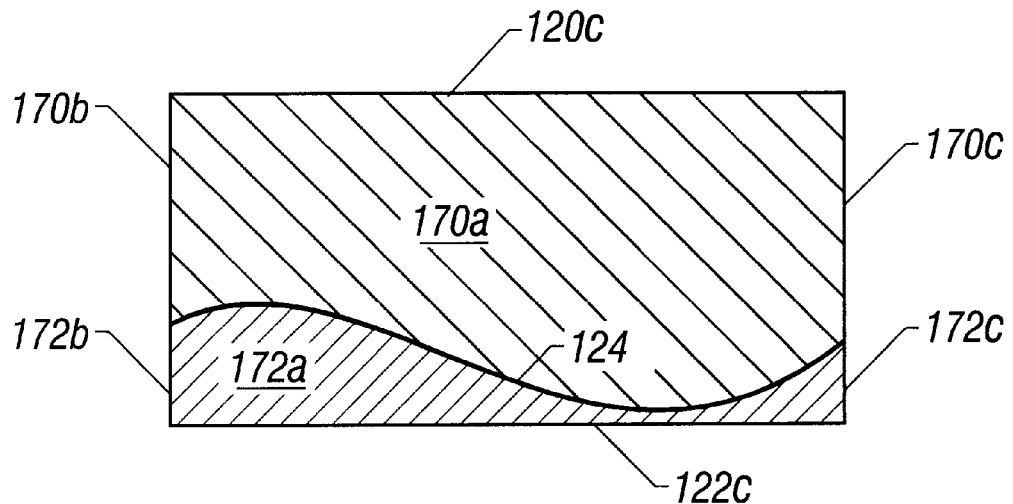

The next step is to move the boundary to its new location and use it to subdivide the cellular model containing cell 150a with a classify command, as shown in FIG. 8e. Cell 150a is now split into two new cells, 170a and 172a, by boundary 124, which remains the same as it was when this scenario started. Again, the geoscience model automatically creates new cells to bound cell 170a and 172a. Cell 170a is bounded by cells 170b, 170c, 120c, and 124. Cell 172a is bounded by cells 172b, 172c, 122c, and 124. Cells 170b and 172b are created by splitting cell 150b, the split occurring where cell 124 intersected cell 150b. Cells 170c and 172c are created by splitting cell 150c, the split occurring where cell 124 intersected cell 150c.

Figure 8F:
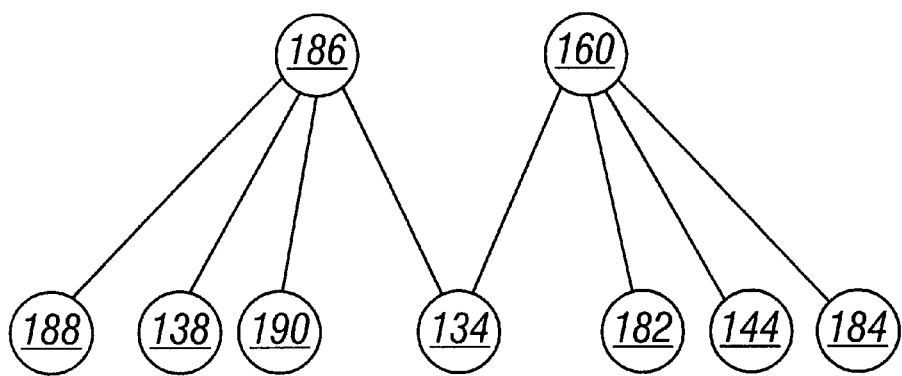

These relationships are illustrated in the topology graph of FIG. 8f. Sub-region 170a, represented by circle 186, is connected to cells 170b, 170c, 120c and 124, represented by circles 188, 190, 138 and 134, respectively. Sub-region 172a, represented by circle 180, is connected to cells 172b, 172c, 122c, and 124, represented by circles 182, 184, 144 and 134, respectively.

A geometry element (such as a feature or a cell) consists of its interior region and its boundary. In Boolean terms, a geometry element is comprised of the union of its boundary with its interior. The exterior of a geometry element is the set of points defined by subtracting the geometry element point set from all other points in space. Alternatively, the geometry element's exterior, boundary, and interior enumerate all the points of a space.

A set of points is closed whenever it contains all the boundaries for an interior region. The system takes a point set and adds in boundaries as needed to make the set closed. Consequently, a closed geometry element is the union of the geometry element's boundary with the geometry element's interior. For a closed geometry element, the union of the boundary with the interior, the union of the boundary with the exterior and the union of the interior with the exterior are all nulls.

A geometry element may be combined with another geometry element resulting in a new geometry element (destroying the two original elements in the process). The operations of combining two geometry elements, A and B, is called classifying the points of one geometry element against those of the other. Classification is the process of determining whether a point is in the interior, boundary, or exterior point sets of the two geometry elements.

Given a point p and a geometry element A, we classify p against A by determining which set—A's interior, boundary, or exterior—contains p. When this is done for all points in geometry elements A and B, the system classifies A against B. Classifying all the points in two geometries against one another and gathering them into point sets of common classification yields eight distinct classification sets illustrated in Table 1, below. These classification sets are the basis for the model building operations.

TABLE 1

| | Classification Sets | |
|---|---|---|
| Set | Definition | Open/Closed |
| I | interior (A) ∩ interior (B) | Open |
| II | interior (A) ∩ exterior (B) | Open |
| III | interior (B) ∩ exterior (A) | Open |
| IV | boundary (A) ∩ boundary (B) | Closed |
| V | boundary (A) ∩ interior (B) | Open |
| VI | boundary (B) ∩ interior (A) | Open |
| VII | boundary (A) ∩ exterior (B) | Open |
| VIII | boundary (B) ∩ exterior (A) | Open |

The system's classify operators are used to combine geometry elements. They each return a particular geometry as the closure of a combination of the classification sets. While other combinations of the classification sets are possible, they are not physically meaningful. The classify operators work with inputs of any dimension.

The classify operators produce the following results, given as inputs geometry elements A and B.

TABLE 2

| Formal Definition of Classify Operators | |
|---|---|
| Function | Point Set Definition |
| Union (A, B) | closure( (I, II, III, IV, V, VI, VII, VIII)) |
| Intersect (A, B) | closure( (I, IV, V, VI)) |
| Subdivide (A, B) | closure( (I, II, IV, V, VI, VII)) |
| Subtract (A, B) | closure( (II, IV, VI*, VII)) |
| Insert (A, B) | closure( (I, II, III, IV, V, VII, VIII)) |
| InsertandTrim (A, B) | closure( (I, III, IV, V, VI*, VIII)) | where "Z*" denotes the external boundaries of Z. Note that only union and intersect operators are symmetric.

All of the classify operators operations take a geometry element called a core as their first argument, and an arbitrary geometry element as their second. If the second argument is not a feature, the operation is destructive to the argument. If the second argument is a feature, the feature is added to the core's active features. In either case, none of the cells in the second argument are allowed to be in the active cells of the core. The returned geometry is the active cells of the core.

The classify operators can operate on geometric elements of the same dimension, such as the two two-dimensional disks 200 (geometry element A) and 202 (geometry element B) in FIG. 9a. The gray coloring of each circle represents different material properties that have to be propagated through the classify commands. The embed callback mechanism provides a default behavior for material property propagation. The sequence of FIGS. 9a–g shows the default material property propagation behaviors by their consistent use of coloring. As discussed later, the default behavior can be overridden for any execution of a classify command.

The union classify operator combines points in both interiors and both boundaries of the two geometric elements, as shown in FIG. 9b, to form a new geometry element, 204.

Intersect combines points in both interiors, both boundaries, or the interior and boundary of the subject geometry elements, as shown in FIG. 9c, to create new geometry element 206.

Subdivide uses B's boundaries to divide A, as shown in FIG. 9d, creating new geometry element 208. For efficiency reasons, a subdivideonly command is also provided which acts just like subdivide command except that it requires an explicit call to a function to make the geometry coherent on a micro-topology level, that is to retriangulate the topology, if necessary. The subdivide function does this function automatically.

Subtract removes B's interior from A, as shown in FIG. 9e, to create new geometry element 210.

Insert and InsertAndTrim combine A and B, but the latter "trims" B outside of A. Insert, illustrated in FIG. 9f, creates new geometry element 212. InsertAndTrim, illustrated in FIG. 9g, creates new geometry element 214.

Similarly, the classify operators can operate on geometric elements having different dimensions, such as the two-dimensional disk 216 (geometric element A) and the one-dimensional line 218 (geometric element B) shown in FIG. 10a.

The union classify operator combines the interior and boundary of geometric objects 216 and 218, as shown in FIG. 10b, to create new geometric object 220.

The intersect classify operator combines points in both interiors, and both boundaries of geometry elements 216 and 218, as shown in FIG. 10c, to form new geometry element 222.

The subdivide and subdivideonly classify operators use B's boundaries to divide A, as shown in FIG. 10d, creating new geometric element 224. The latter requires an explicit call to a function to make the geometry coherent, as discussed above.

The subtract classify operator removes B's interior from A, as shown in FIG. 10e, to create a new geometric element 226. A boundary 227 is added to provide topological closure.

The insert classify operator combines A and B, as shown in FIG. 10f, to create a new geometric element 228.

The InsertAndTrim classify operator combines A and B and "trims" B outside of A, as shown in FIG. 10g, to create a new geometric element 230.

In certain instances, two classify operators will generate the same point-set result when a lower-dimensional object is classified against a higher-dimensional object. For example, the union and insert commands output the same result (FIGS. 10b and 10f), as do subdivide, subtract, and InsertAndTrim when a one-dimensional object is classified against a two-dimensional object in two-space (FIGS. 10d, 10e and 10g).

Consider the classification of a large sheet with respect to a small solid box using the subtract or subdivide classify operators. If the sheet is not part of a feature (which has point set preservation), then at the conclusion of the operation the part of the sheet lying outside the box boundary is gone. If, however, the sheet is a feature, then when the sheet splits in two, the pointset preserving split event handler will add the part outside the box to the sheet feature's children. Since the feature now exerts a control on the part of the sheet that is outside the box, it is not deleted. The classification creates a set of four cell bridges joining the part of the sheet inside the box with the part that is outside, resulting in a box with a "skirt". In effect, pointset preservation has subverted the expected geometric outcome.

This is remedied by dissociating (discussed below) the sheet feature's skirt cells from the list of active cells. The sheet feature continues to have a pointer to the skirt cells. Classification is only against the active cells. Thus, only the sheet cells in the list of active cells interact during classification—as expected. Cells not on the list of active cells are called "inactive". An active feature can contain inactive cells. It is possible to activate inactive cells at any time.

There is a control associated with each inactive cell. Under this control, inactive cells can be removed from all features and will not disappear from the system unless and until the application calls a specific function to delete them. It is legal to manually append an inactive cell to any feature.

There is no other mechanism for introducing inactive cells into a feature.

The classify operations permit the caller to override the embed event callback defined for all instances of a property attached to all sites and manually assign a particular parent's property to all overlapped regions discovered during the classification. One parent geometric object can be source of some property assignments, the other parent geometric object for others, and still other property assignments can be derived through invocation of embed event callbacks and not be a direct copy of either parent's definition.

An "embed resolution packet" is used to define this behavior. This packet contains two lists, each entry in which references a "property parameter data item". The first (second) list refers to the properties assigned to the first (second) argument in the union or intersect. No property can appear in both lists. A property not specified in either list is treated as a request to use the embed event handler to derive the overlapped region's assignment. The packet's list contents can be changed in any manner that the application sees fit, including not providing a packet at all. A missing packet means that all property assignments should be derived through invocation of embed event callbacks.

The following topological editing services are also provided. These operations are destructive to non-feature geometries.

The copy command copies a portion of a geometry element. The copied portion is dissociated (described below) and will have a copy of any material properties the original had, if the appropriate event handlers were specified in the representation template.

The dissociate command removes cells of any dimension from a geometry, as shown in FIG. 11a. If point 240 is dissociated from input geometry element 242, the result is input geometry element 244 (without the point) and dissociated feature, point 246. In FIGS. 11a–e, the original geometry appears to the far left and the cell or cells to be dissociated appear immediately to its right. Those same cells (e.g., point 240 in FIG. 11a) appear in the original geometry. The resulting geometry element and the dissociated feature appear to the right of an "equals" sign, which represents the dissociate command.

The dissociate command acts like a copy whenever the input geometry is a part of the limit boundary of the input, as shown in FIG. 11b. Dissociating point 248, which is part of the boundary of geometry element 250, produces geometry element 252, identical to geometry element 250, and dissociated feature 254.

Merging two cells can be caused by either dissociating a boundary or interior cell, as shown in FIGS. 11c and 11d. In FIG. 11c, boundary 256 is dissociated from geometry element 258 to produce geometry cell 260 and dissociated feature 262. While geometry element 258 has two cells 264, 266, geometry element 260 is a single cell with a seam 268.

In FIG. 11d, interior region 270 is dissociated from geometry element 272 to produce a new geometry element 274. While geometry element 272 has three cells 278, 280, 282, geometry element 274 has a single cell and two seams 284, 286.

Dissociating cells that are bounded by the limit cells of the input geometry disconnects the input, as shown in FIG. 11e. In FIG. 11e, two cells 288 are dissociated from geometry element 290. Cells 288 are bounded by the limit cells 292 of geometry element 290. The result is two disconnected geometry elements 294, 296.

Another topological editing service is the "cut" command. The cells of the input geometry in the cut command can be of any dimension. Cutting degenerate boundaries (boundaries of dimension n embedded in cells of dimension greater than n+1) as shown in FIG. 12a, or cells which are part of the limits of the input geometry, as shown in FIG. 12b, is equivalent to a copy command. In FIG. 12a, degenerate boundary point 310 is cut from geometry element 312 to produce new geometry element 314, which is identical to geometry element 312, and point 316. In FIGS. 12a–g, the original geometry appears to the far left and the cell or cells to be cut appear immediately to its right. Those same cells (e.g., point 310 in FIG. 12a) appear in the original geometry. The resulting geometry element and the cut feature appear to the right of an "equals" sign, which represents the cut command.

In FIG. 12b, cell 318, which is part of the limit of geometry element 320, is cut from geometry element 320. The result is geometry element 322, which is identical to geometry element 320, and point 324.

Cutting internal boundaries which do not propagate all the way through the part geometry, as in FIG. 12c, results in tearing the geometry. In FIG. 12c, boundary 326 is cut from geometry element 328 to produce geometry element 330 and geometry element 332. Geometry element 330 has a tear 334. The shape of the tear has been changed in the figure to show the tear's existence. The cut command does not change the shape of the cell; it only edits the topological relationships.

Cutting internal regions from a geometry, as in FIG. 12d, result in a geometry with a "hole" in it. The set of points where the internal region used to be will no longer classify as being in the geometry. This behavior differs from the dissociate command which would merge the dissociated area into its neighboring regions. In FIG. 12d, internal region 336 is cut from geometry element 338, to produce geometry element 340 and geometry element 342. Geometry element 340 has a hole 344.

When the input geometry element is a set of regions with boundaries which form part of the limit of the geometry element, as in FIG. 12e, the geometry element will be split into two in the same manner as the dissociate command. In FIG. 12e, regions 346 are cut from geometry element 348 to produce geometry elements 350 and 352.

Cutting a geometry element which spans the entire geometry element, as shown in FIG. 12f, will have the side affect of splitting the output geometry element into two geometry elements. In FIG. 12f, geometry element 354 is cut from geometry element 356 to produce three geometry elements, 358, 360, 362.

An output geometry may contain geometry elements of different dimensions, as shown in FIG. 12g. In FIG. 12g, regions 364 are cut from geometry element 366 to produce three geometry elements 368, 370, 372. After the cut command the point 370 will be a separate geometry element since it is no longer connected to any other objects.

Figure 13A:
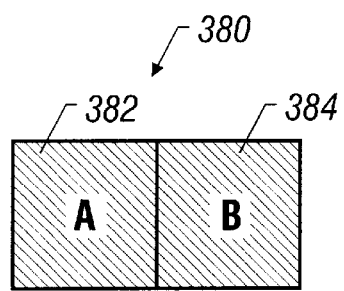
Figure 13B:
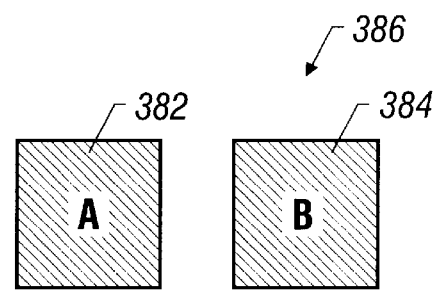
Figure 13C:
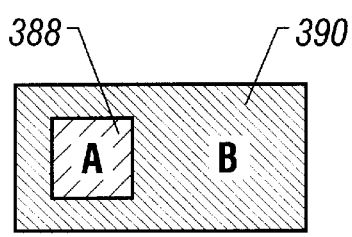
Figure 13D:
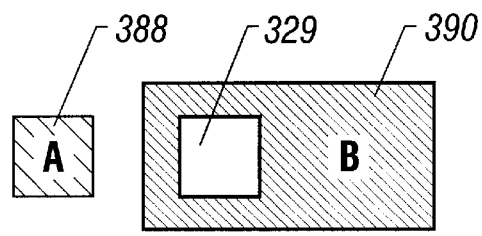

Another topological editing operator is the extract command, which operates as a cut or gouge. In FIG. 13a, a geometry element 380 consists of two sheets 382 and 384 sewn together along a common edge. After sheet 382 is extracted, shown in FIG. 13b, the geometry element 386 contains sheet 384 only. Hence, the extract has cut the original sheet.

In FIG. 13a, the two-dimensional cell 388 is completely contained in the surrounding two-dimensional sheet 390. After extraction, sheet 390 has a hole 392 (sheet 390's interior frame consists of sub-cells that are limits, rather than seams.)

For any other cell arrangement, this operator is equivalent to the copy command. When applied to an active feature, the extract operator deactivates the feature. Moreover, a cell in the active feature is also in the deactivated feature if and only if the cell is a root, that is, not the boundary of any other cell.

In addition to allowing the end-user to join and divide geometry pieces into geometry models, the geoscience model allows the end-user to specify how properties associated with the input models are propagated to the output model.

When one of the classify operators or topological editing services is used, the split, merge or embed call backs are invoked to propagate material property values from the parent geometric elements to the newly created geometric elements, as previously discussed.

Low-level control of property propagation during classify and dissociate commands is provided by an event driven callback mechanism. A callback is executed for every property attached to a cell whenever it is split, embedded, or merged. The split, embed, and merge callbacks are the same for all instances of that property in the geometry model. The callbacks are independent of attachment site. That is, call backs for a given property are the same wherever that property is attached. For example, the "copy" call back is the same when the property is on a cell or on a feature or on a cell bridge. An additional high-level control of property propagation is provided to the end-user who can specify run-time preferences for property propagation through the classify and dissociate commands, as described below. A call back is, in effect, a default behavior which can be overridden by an application.

Property propagation is simple when a cell is split. Suppose, as shown in FIG. 14a, single parent 400 generates two offspring 402, 404 which need material property values propagated from the parent. The system's default behavior is to propagate all material property values from the parent to one child and none of the properties to the other child. The system then executes the split call back for each attribute to allow the application to update property values as needed for both children. For example, the parent cell may have a stored volume property with a value of one cubic foot. After splitting, the one child has a volume property with an initial value of one cubic foot and the other child has no volume property. The split call back allows the application to assign a volume property to the second child and to recompute a volume value for each child (e.g., one quarter for one child and three quarters for the other).

Alternatively, the system's default behavior could be to place a copy of each of the parent's properties in both children. The split call back would then be called to update those values.

Figure 14C:
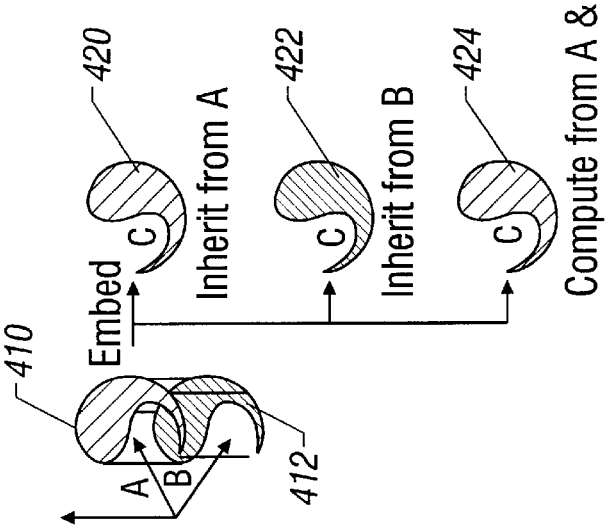
Figure 14B:
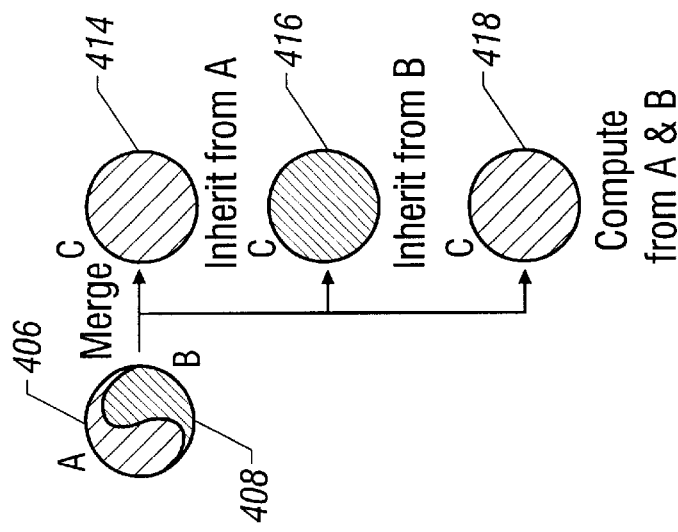
Figure 14A:
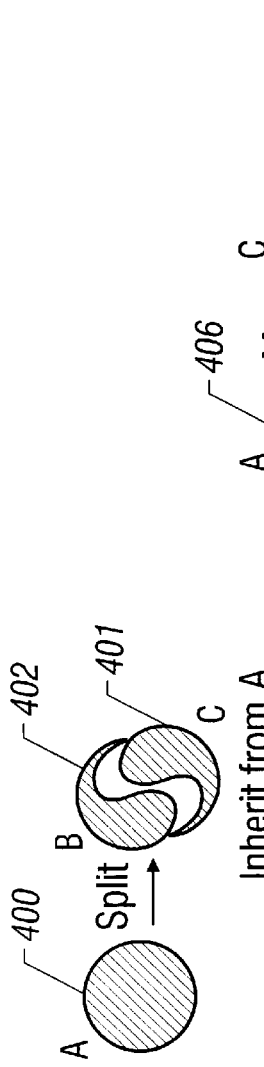

Property propagation on merge and embed is more complicated, as shown in FIGS. 14b and 14c. In these cases a pair of parents, 406, 408 in FIG. 14b and 410, 412 in FIG. 14b., generate a single offspring, one of 414, 416, or 418 in FIG. 14b and one of 420, 422, 424 in FIG. 14c. Through high level control of property propagation, a user can specify one of three behaviors:

a. propagate from parent A, 414 in FIG. 14b, 420 in FIG. 14c;
 b. propagate from parent B, 416 in FIG. 14b, 422 in FIG. 14c; or
 c. use the values of both parent A and B to compute a new property representation, 418 in FIG. 14b, 424 in FIG. 14c.

The system exports control of these behaviors to the application programming interface 28, FIG. 2, defaulting to computing a new property representation through the use of the embed or merge callback and using a flag to indicate whether to inherit from parent A or parent B. This is accomplished at the low level by using the embed and merge callbacks by default and by using a copy callback to implement the inheritance behavior.

The application programming interface allows the end-user to specify the propagation of properties on a per property basis. The input to the classify commands is a list of properties, each marked as to how it should propagate. Properties not on the list default to computing new representations. For example, it is possible to execute a classify command which inherits property 1 from parent A, property 2 from parent B, and computes a new representation for property 3 based on the representations of both parents A and B.

Figure 15A:
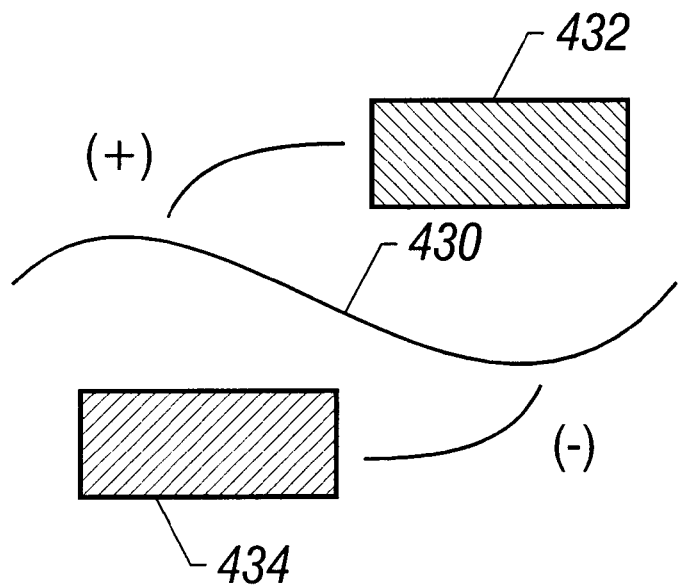
Figure 15B:
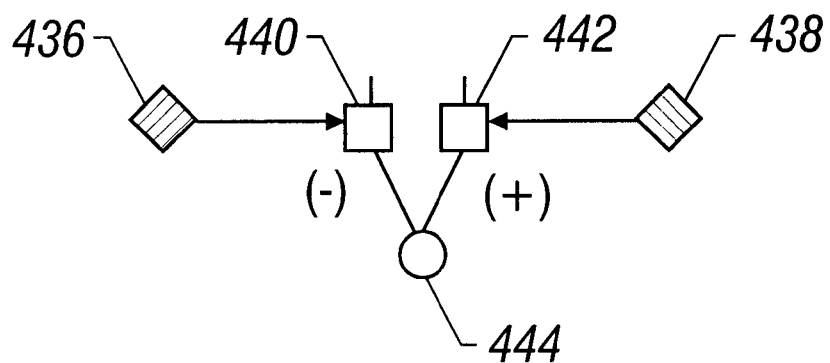
Figure 15C:
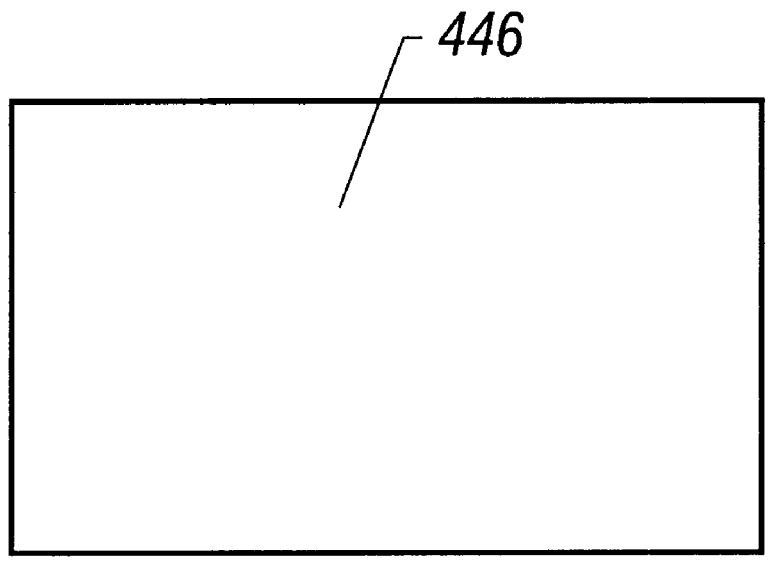
Figure 15D:
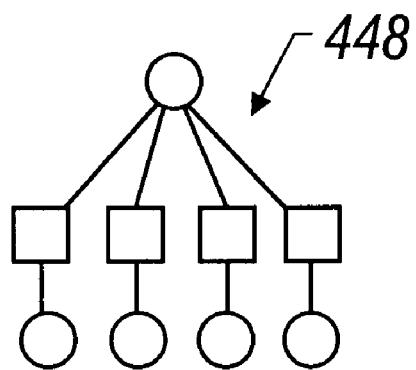
Figure 15E:
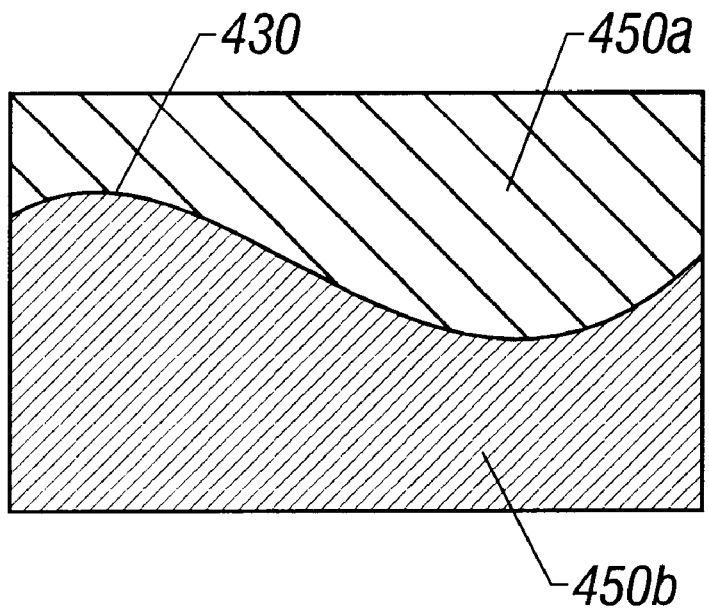
Figure 15F:
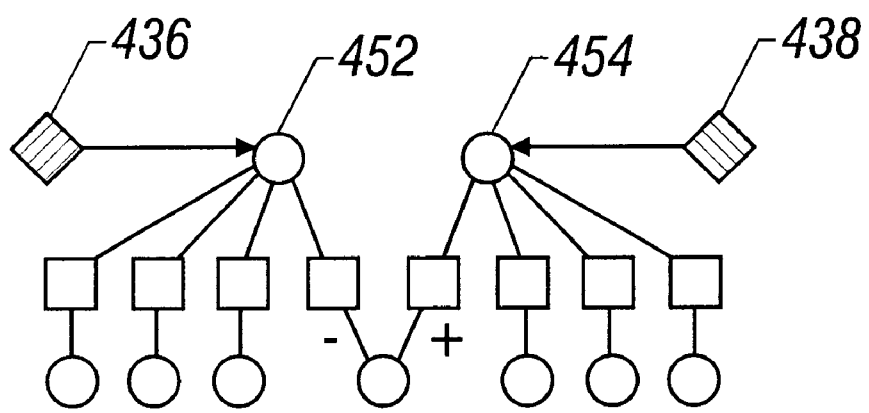

A two-dimensional example in which the property callback mechanism can be used to propagate boundary properties into sub-regions is illustrated in FIGS. 15a–15f. FIGS. 15a, 15c and 15e show the model as an end-user might see it. FIGS. 15b, 15d, 15f show topology graphs of these models. Curve cell 430 has attached to it sub-region boundary properties, represented in FIG. 15a by shaded rectangles 432, 434. The sub-region boundary properties may have been attached to curve cell 430 during an earlier dissociate operation or they may have been assigned by the user when the boundary was created. The boundary properties 436, 438 are attached to the cell bridges 440, 442 of curve cell 430, represented by circle 444, as shown in FIG. 15b. The cell bridges are not yet connected to sub-regions.

A simple rectangular sub-region 446, shown in FIG. 15c, is represented by a topological graph 448, shown in FIG. 15d. For simplicity, only the one- and two-dimensional cells and connect bridges are shown. The zero-dimensional cells and cell bridges are not shown. The features are not shown.

The sub-region 446 can be sub-divided into two cells 450a and 450b by curve 430, as shown in FIG. 15e. In this example, the split callback is used to propagate properties from the curve 430 into the sub-region by changing the property attach sites for properties 436 and 438 from the cell bridges 440 and 442 to the sub-region cells 450a and 450b, represented by circles 238 and 239, as shown in FIG. 15f.

Figure 16A:
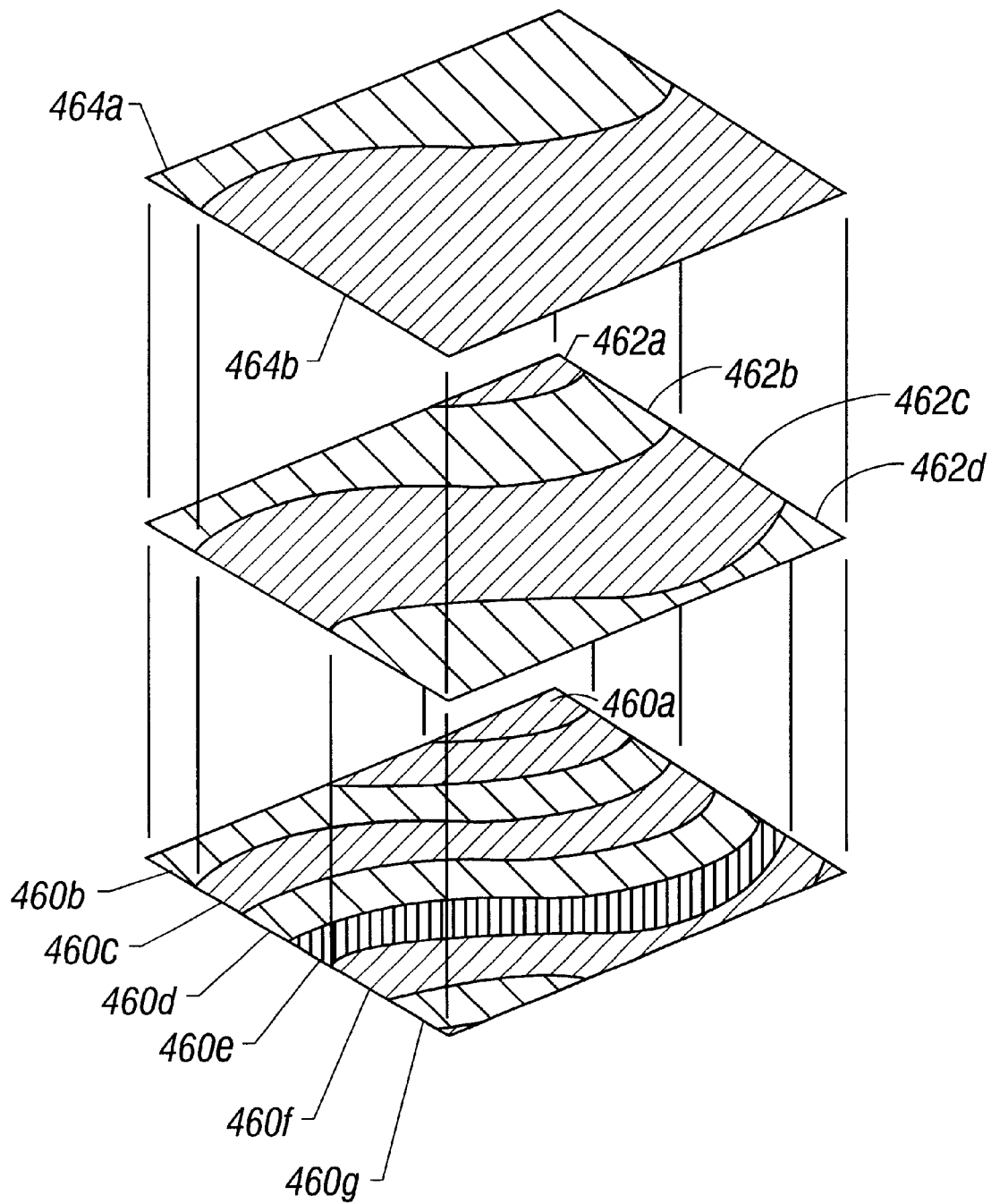
Figure 16B:
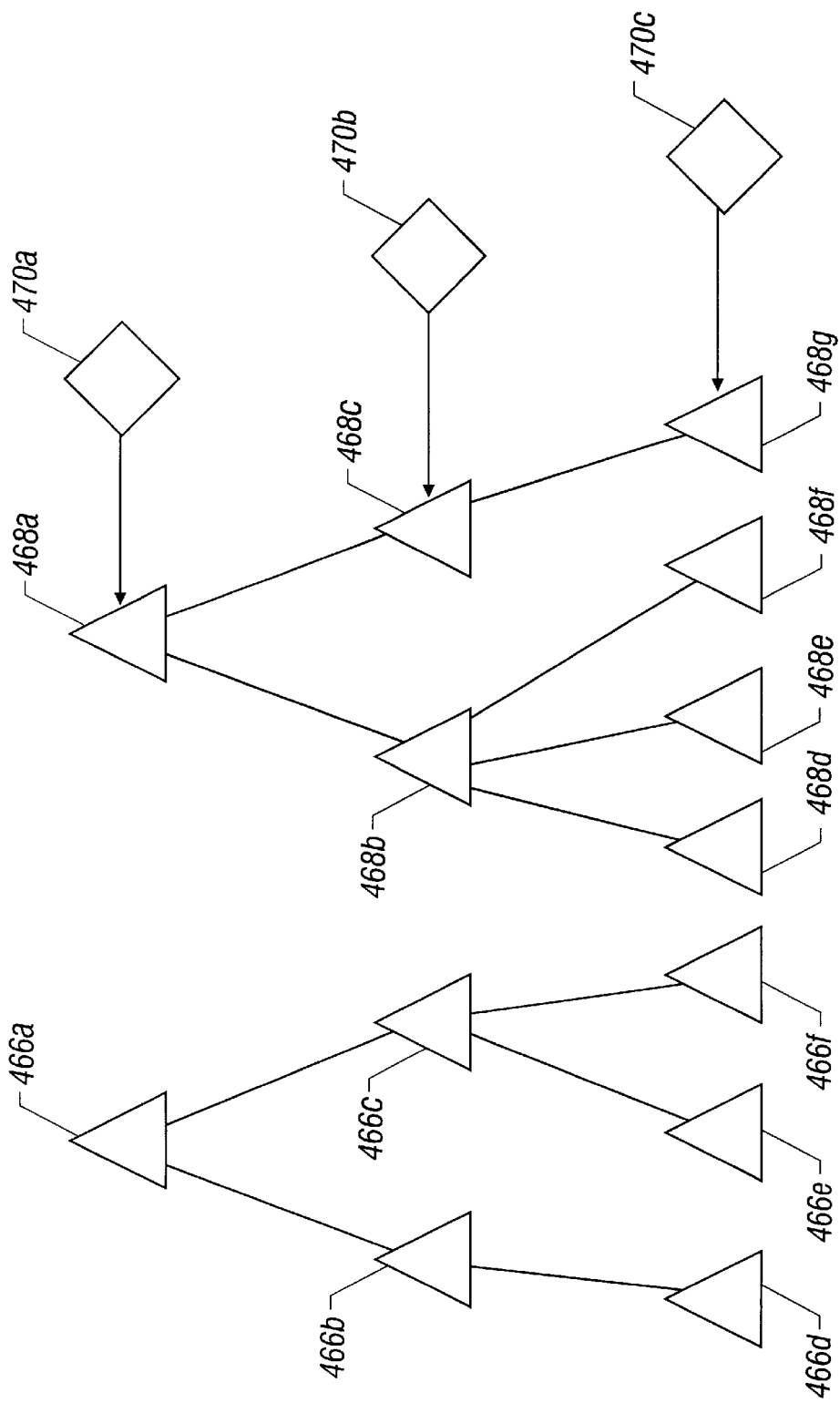

When features overlap one another, as shown in FIG. 16a, the value of a property at a point can depend on which of the overlapping features is being interrogated. The model shown in FIG. 16a includes three sets of overlapping features. A set of beds 460a–g (the lowest level image) is organized into a set of members 462a–d (the middle level), which is in turn organized into a set of formations 464a–b (the highest level). The result is a hierarchy of features, as shown in FIG. 16b, in which every point in space is contained in one bed, one member, and one formation feature. Feature 464a, represented by triangle 466a, contains features 462a and 462b, represented by triangles 466b and 466c, respectively. Feature 462a, represented by triangle 466b, contains feature 460a, represented by triangle 466d. Feature 462b, represented by triangle 466c, contains features 460b and 460c, represented by triangles 466e and 466f, respectively. Feature 464b, represented by triangle 468a, contains features 462c and 462d, represented by triangles 468b and 468c, respectively. Feature 462c, represented by triangle 468b, contains features 460d, 460e and 460f, represented by triangles 468d, 468e, and 468f, respectively. Feature 468c, represented by triangle 468c, contains feature 460g, represented by triangle 468g.

Each feature has a property, i.e. 470a, 470b, 470c (for simplicity only three are shown), attached to it. Property 470a may be the average value of a material property over formation 464b, property 470b may be the average value of the same material property over member 462d, and property 470c may be the average of the material property over bed 460g. When that property is evaluated, the feature must be specified so that the proper property can be evaluated.

When the property does not vary over the cell extent, such as an average value, the property can be attached directly to the feature, as shown in FIG. 16b. Feature-bridges can be used as attachment sites when the properties vary over the cell extent for each containing feature. When making a property evaluation in these situations the end-user specifies which feature to use.

The property propagation mechanism can be used to edit the shape of a feature during a classify operation. A boundary may have attached to it two properties: a bounded-from-above property, which defines the feature the boundary bounds from above, and a bounded-from-below property, which defines the feature the boundary bounds from below. These properties may be attached to the boundary when it is dissociated from a sub-region. If the boundary is used to subdivide the sub-region, the cells of the sub-region are split by the boundary and sorted between the two features. The sorting is controlled by the bounded-from-above and bounded-from-below properties.

The shape of a feature does not change as a side effect of the execution of a classify operator or a topological editing service. The shape of a feature is represented by the cells it contains. As cells are split, merged, and embedded, the related features' cell lists must be updated. This is done by representing the cell's contained-in relationship as a property. Whenever a cell is split, merged, or embedded, a callback function for each containing feature is executed, giving those features the opportunity to properly update their contains lists. This set of callback functions is called the feature's admission policy.

The rules to implement the shape preserving property for features are:

a. on split, replace the parent cell with the offspring cells;
 b. on merge, if both parents are in the feature, replace them with the offspring; otherwise, prohibit the merge;
 c. on embed, if both parents are in the feature, replace them with the offspring; otherwise, prohibit the embed.

If either an embed or a merge are prohibited as discussed above, the features may be edited so that the embed or merge follows the rules and is no longer prohibited.

Figure 17D:
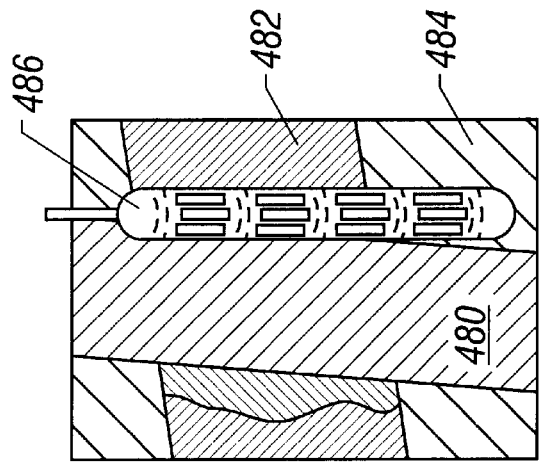
Figure 17C:
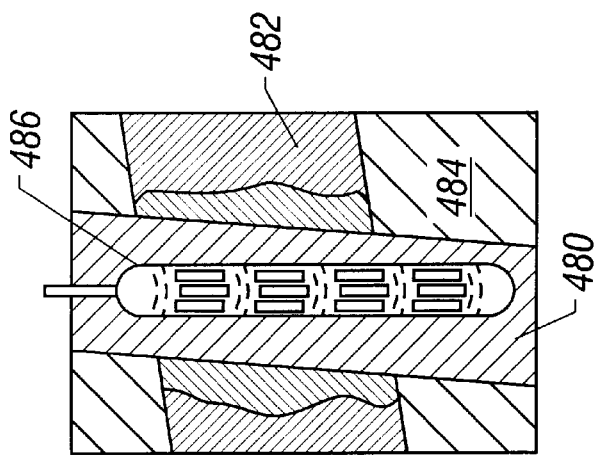
Figure 17B:
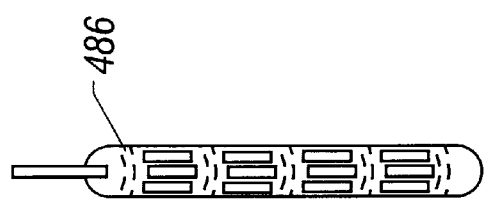
Figure 17A:
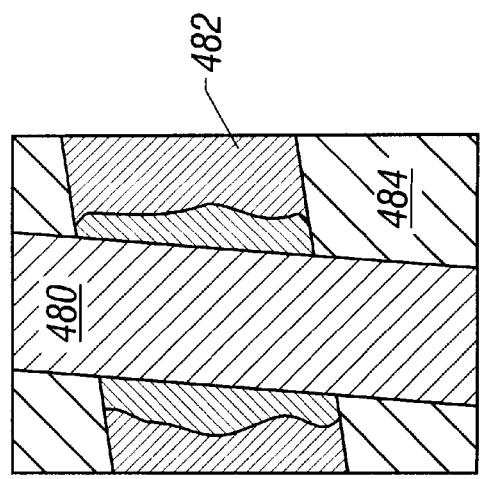

The feature admissions policy can be used to prevent undesirable model changes, as shown in FIGS. 17a–17d. A section of borehole 480 is drilled through a sequence of sub-surface beds 482, 484, as shown in FIG. 17a. An acquisition tool 486, FIG. 17b, can be lowered into the borehole model to make measurements of the rock and fluid properties of the formations surrounding the borehole. The tool model is inserted into the borehole model to simulate its data acquisition behavior, as shown in FIG. 17c. There are tool insertion locations that should be prohibited, as shown in FIG. 17d. The tool must always stay within the borehole; it is illegal to move the tool into the surrounding rock. Prohibiting illegal placement of the tool can be automated by representing the tool as a feature and implementing the admissions policy's embed callback, which informs the application whenever the tool interferes with the surrounding rock.

The algorithm employed to classify a point and to locate a property evaluator is nontrivial, so it is important to minimize the number of evaluator lookups when sampling a property at many points along a trajectory through a geometry model, as shown in FIGS. 18a–18d.

In this example involving a well bore 490 drilled through a group of beds 492a–c, FIGS. 18a and 18b, the trajectory 494 is a one-dimensional curve, so the system only needs to determine the entry and exit points of the trajectory for each sub-region that the trajectory crosses. Within each sub-region the system performs exactly one material property evaluator lookup. Therefore the number of lookups that the system executes is independent of the sampling interval along the trajectory.

A special intersection algorithm is used to classify a ray trajectory against a geometry model. As shown in FIG. 18c, the algorithm returns a set of classified ray edges 496a–d and ray points 498a–e, each indicating to which cell they correspond, without modifying the topology of the model. The sample points 500 along the trajectory are illustrated in FIG. 18d. This algorithm is used to design an efficient finite difference grid generator whose input is a geometry model and a high level grid description on whose output is a finite differences grid.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a complied or interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

What is claimed is:

1. A method for adjusting geological data representing a model of the characteristics of a geological region, to better match data acquired from the geological region, the method being implemented in a programmed computer comprising a processor, a data storage system, at least one input device, and at least one output device, the method and the data being stored on computer-readable media, the method comprising organizing the data on the computer-readable media to represent a first geometry element, the first geometry element corresponding to a subset of the region and having an interior, boundary and exterior and having points each point having a location on the interior or the boundary of the first geometry element, and a second geometry element, the second geometry element having an interior, an external boundary and an exterior and having points each point having a location on the interior or the external boundary of the second geometry element;

aligning at least a portion of the points of the second geometry element with at least a portion of the points of the first geometry element in response to input data received by the programmed computer through at least one of the input devices;

classifying the second geometry element against the first geometry element to combine the first and second geometry elements, wherein classifying comprises deciding whether to retain a point on one of the geometry elements depending on whether the location of the point coincides with the interior, boundary or exterior of the other geometry element;

wherein not retaining a point comprises
    deactivating the point if the geometry element of which it is a part has been designated a feature;
    discarding the point otherwise applying the retained points to at least one of the output devices.

2. The method of claim 1, wherein the dimension of the second geometry element is different from the dimension of the first geometry element.

3. The method of claim 1, wherein classifying comprises retaining the following points:

(I) points in the interior of the first geometry element and in the interior of the second geometry element;

(II) points in the interior of the first geometry element and in the exterior of the second geometry element:

(IV) points on the boundary of the first geometry element and on the boundary of the second geometry element;

(V) points on the boundary of the first geometry element and in the interior of the second geometry element:

(VI) points on the boundary of the second geometry element and in the interior of the first geometry element;

(VII) points on the boundary of the first geometry element and in the exterior of the second geometry element; and the remaining points are not retained.

4. The method of claim 1, wherein classifying comprises retaining the following points:

(I) points in the interior of the first geometry element and in the interior of the second geometry element;

(II) points in the interior of the first geometry element and in the exterior of the second geometry element;

(III) points on the boundary of the second geometry element and in the exterior of the first geometry element;

(IV) points on the boundary of the first geometry element and on the boundary of the second geometry element;

(V) points on the boundary of the first geometry element and in the interior of the second geometry element;

(VII) points on the bounda of the first geometry element and in the exterior of the second geometry element;

(VIII) points on the boundary of the second geometry element and in the exterior of the first geometry element; and the remaining points are not retained.

5. The method of claim 1, wherein classifying comprises retaining the following points:

(I) points in the interior of the first geometry element and in the interior of the second geometry element;

(III) points on the boundary of the second geometry element and in the exterior of the first geometry element;

(IV) points on the boundary of the first geometry element and on the boundary of the second geometry element;

(V) points on the boundary of the first geometry element and in the interior of the second geometry element;

(VI) points on the boundary of the second geometry element and in the interior of the first geometry element;

(VIII) points on the boundary of the second geometry element and in the exterior of the first geometry element; and the remaining points are not retained.

6. A method for adjusting geological data representing a model of the characteristics of a geological region, to better match data acquired from the geological region, the method being implemented in a programmed computer comprising a processor, a data storage system, at least one input device, and at least one output device, the method and the data stored on computer-readable media, the method comprising organizing the data to represent a geometry element comprising at least two cells with topological relationships between the cells, the geometry element having a shape;

topologically editing the geometry element by revising the topological relationship between the cells or the shape of the geometry element in response to an input received by the programmed computer through at least one input device; and applying the edited points to at least one of the output devices.

7. The method of claim 6, wherein editing comprises changing the topological relationship between the cells without changing the shape of the geometry element.

8. The method of claim 6, wherein editing comprises not retaining a cell from the geometry element.

9. The method of claim 6, wherein editing comprises changing the topological relationship between the cells and changing the shape of the geometry element.

10. A method for adjusting geological data representing a model of the characteristics of a region, to better match data acquired from the geological region, the method being implemented in a programmed computer comprising a processor, a data storage system, at least one input device, and at least one output device, the method and the data stored on computer-readable media, the method comprising organizing the data into a database stored on the computer-readable media, the database comprising a geometry part and a design part, the geometry part being separate from the design part, the design part comprising data related to a feature, the feature having contextual meaning to an application, feature data in the design part being accessible by providing the name of the feature to the design part, the geometry part comprising data related to the feature, feature data in the geometry part being accessible by providing the name of the feature to the geometry part;

accessing the feature data from the design part and the feature data from the geometry part; and providing the feature data to the application.

11. The method of claim 10, wherein the design part of the database comprises a description of the geometry part of the database.

12. A method for adjusting geological data representing a model of the characteristics of a geological region, to better match data acquired from the geological region, the method being implemented in a programmed computer comprising a processor, a data storage system, at least one input device, and at least one output device, the method and the data stored on computer-readable media, the method comprising organizing the data to represent a plurality of geometry elements, each geometry element corresponding to a subset of the region;

a first feature comprising a first subset of the plurality of geometry elements, the first feature having a shape corresponding to the aggregate shape of the first subset of geometry elements, the first feature being meaningful to an application; and applying the first feature to at least one of the output devices.

13. The method of claim 12, wherein the first feature comprises a first sub-subset of geometry elements and a second sub-subset of geometry elements disconnected from the first sub-subset of geometry elements.

14. The method of claim 12, further comprising organizing the data to represent a second feature, the second feature being meaningful to an application, the second feature comprising a second subset of the plurality of geometry elements wherein the second subset of geometry elements overlaps the first subset of geometry elements.

15. The method of claim 14, wherein the second feature is a sub-subset of the first feature.

16. The method of claim 12, further comprising attaching a material property to the first feature so that the material property applies to all geometry elements in the first subset of the plurality of geometry elements.

17. The method of claim 12, wherein the organizing is accomplished interactively.

18. A method for adjusting geological data, representing a model of the characteristics of a geological region, to better match data acquired from the geological region, the method being implemented in a programmed computer comprising a processor, a data storage system, at least one input device, and at least one output device, the method and the data stored on computer-readable media, the method comprising organizing the data to represent the geological region;

subdividing the region into a first geometry element and a second geometry element with a boundary separating the first geometry element and the second geometry element at a first location so that the first geometry element is on the first side of the boundary and the second geometry element is on the second side of the boundary;

attaching a bounded-from-first-side property and a bounded-from-second-side property to the boundary, the bounded-from-first-side property defining a first feature on the first side of the boundary the bounded-from-second-side property defining a second feature on the second side of the boundary;

dissociating the boundary from the region by deactivating the boundary; and subdividing the region with the boundary at a new location by reactivating the boundary at the new location, the region on the first side of the boundary being the first feature and the region on the second side of the boundary being the second feature.

19. The method of claim 18, further comprising attaching a material property to the boundary; and evaluating the material property at a point in the region as a boundary value problem using a value of the material property attached to the boundary as the boundary value.

20. A method for adjusting geological data representing a model of the characteristics of a geological region, to better match data acquired from the geological region, the method being implemented in a programmed computer comprsing a processor a data storage system at least one input device and at least one output device, the method and the data stored on computer-readable media, the method comprising organizing the data to represent a first plurality of geometry elements and a classification geometry element;

attaching a material property to each geometry element in a subset of the first plurality of geometry elements;

classifying the classification geometry element into the subset to produce a second plurality of geometry elements and a third plurality of geometry elements; and propagating the material property from the subset to the second plurality of geometry elements.

21. The method of claim 20, further comprising propagating the material property from the classification geometry element to the second plurality of geometry elements.

22. A method for adjusting geological data representing a model of the characteristics of a geological regions to better match data acquired from the geological region the method being implemented in a programmed computer comprising a processor, a data storage system, at least one input device, and at least one output device, the method and the data stored on computer-readable media, the method comprising organizing the data to represent a first plurality of geometry elements;

attaching a material property to each of the first plurality of geometry elements;

producing a second plurality of geometry elements by splitting or merging the geometry elements in the first plurality of geometry elements; and propagating the material property from the first plurality of geometry elements to the second plurality of geometry elements.

23. A method for adjusting geological data representing a model of the characteristics of a geological region, to better match data acquired from the geological region, the method being implemented in a programmed computer comprising a processor a data storage system at least one input device, and at least one output device, the method and the data stored on computer-readable media, the method comprising defining, in any order:

a topology of a feature comprising a set of geometry elements, each geometry element corresponding to a subset of the regions the feature being meaningful to an application;

a material property for the feature; and a shape for the feature, the shape corresponding to the aggregate shape of the set of geometry elements.

24. A method for adjusting geological data representing a model of the characteristics of a geological region, to better match data acquired from the geological region, the method being implemented in a programmed computer comprising a processor, a data storage system, at least one input device, and at least one output device, the method and the data stored on computer-readable media, the method comprising organizing the data into a feature comprising a set of geometry elements, each geometry element corresponding to a subset of the region the feature being meaningful to an application;

attaching to the feature a first plurality of properties;

attaching to the feature a second plurality of properties;

activating the second plurality of properties and deactivating the first plurality of properties.

25. A computer system for adjusting geological data representing a model of the characteristics of a geological region, to better match data acquired from the geological region, the computer system comprising a processor, a data storage system at least one input device, and at least one output device, the geological data being stored on computer-readable media, the computer system comprising means for organizing the data to represent a first geometry element, the first geometry element corresponding to a subset of the region and having an interior, boundary and exterior and having points each point having a location on the interior or the boundary of the first geometry element, and a second geometry element, the second geometry element having an interior, an external boundary and an exterior and having points each point having a location on the interior or the external boundary of the second geometry element;

means for aligning at least a portion of the points of the second geometry element with at least a portion of the points of the first geometry element in response to input data received by the programmed computer through at least one of the input devices;

means for classifying the second geometry element against the first geometry element to combine the first and second geometry elements, wherein classifying comprises deciding whether to retain a point on one of the geometry elements depending on whether the location of the point coincides with the interior, boundary or exterior of the other geometry element;

wherein not retaining a point comprises deactivating the point if the geometry element of which it is a part has been designated a feature;

discarding the point otherwise applying the retained points to at least one of the output devices.

26. The computer system of claim 25, wherein the dimension of the second geometry element is different from the dimension of the first geometry element.

27. The computer system of claim 25, wherein the classifying means comprises means for retaining the following points:
(I) points in the interior of the first geometry element and in the interior of the second geometry element:
(II) points in the interior of the first geometry element and in the exterior of the second geometry element,
(IV) points on the boundary of the first geometry element and on the boundary of the second geometry element;

(V) points on the boundary of the first geometry element and in the interior of the second geometry element;
(VI) points on the boundary of the second geometry element and in the interior of the first geometry element;
(VII) points on the boundary of the first geometry element and in the exterior of the second geometry element; and means for not retaining the remaining points.

28. The computer system of claim 25, wherein the classifying means comprises
means for retaining the following points:
(I) points in the interior of the first geometry element and in the interior of the second geometry element;
(II) points in the interior of the first geometry element and in the exterior of the second geometry element;
(III) points on the boundary of the second geometry element and in the exterior of the first geometry element;
(IV) points on the boundary of the first geometry element and on the boundary of the second geometry element;
(V) points on the boundary of the first geometry element and in the interior of the second geometry element:
(VII) points on the boundary of the first geometry element and in the exterior of the second geometry element;
(VIII) points on the boundary of the second geometry element and in the exterior of the first geometry element; and means for not retaining the remaining points.

29. The computer system of claim 25, wherein the classifying means comprises
means for retaining the following points:
(I) points in the interior of the first geometry element and in the interior of the second geometry element;
(III) points on the boundary of the second geometry element and in the exterior of the first geometry element;
(IV) points on the boundary of the first geometry element and on the boundary of the second geometry element;
(V) points on the boundary of the first geometry element and in the interior of the second geometry element;
(VI) points on the boundary of the second geometry element and in the interior of the first geometry element;
(VIII) points on the boundary of the second geometry element and in the exterior of the first geometry element; and means for not retaining the remaining points.

30. A computer system for adjusting geological data representing a model of the characteristics of a geological region to better match data acquired from the geological region, the computer system comprising a processor, a data storage system, at least one input device, and at least one output device, the geological data stored on computer-readable media, the computer system comprising
means for organizing the data to represent a geometry element comprising at least two cells with topological relationships between the cells, the geometry element having a shape;
means for topologically editing the geometry element by revising the topological relationship between the cells or the shape of the geometry element in response to an input received by the programmed computer through at least one input device; and
means for applying the edited points to at least one of the output devices.

31. The computer system of claim 30, wherein the editing means comprises means for changing the topological relationship between the cells without changing the shape of the geometry element.

32. The computer system of claim 30, wherein
the editing means comprises means for not retaining a cell from the geometry element.

33. The computer system of claim 30, wherein
the editing means comprises means for changing the topological relationship between the cells and changing the shape of the geometry element.

34. A computer system for analyzing data corresponding to a region in space stored on computer-readable media, comprising
a database comprising a geometry part;
a design part, the geometry part being separate from the design part
the design part comprising data related to a feature, the feature having contextual meaning to an application, feature data in the design part being accessible by providing the name of the feature to the design part, the geometry part comprising data related to the feature, feature data in the geometry part being accessible by providing the name of the feature to the geometry part;
means for accessing the feature data from the design part and the feature data from the geometry part; and
means for providing the feature data to the application.

35. The computer system of claim 34, wherein the design part of the database comprises a description of the geometry part of the database.

36. A computer system for adjusting geological data, representing a model of the characteristics of a geological region, to better match data acquired from the geological region, the computer system comprising a processor a data storage system, at least one input device, and at least one output device, the geological data stored on computer-readable media, the computer system comprising
means for organizing the data to represent a plurality of geometry elements, each geometry element corresponding to a subset of the region; and
a first feature comprising a first subset of the plurality of geometry elements, the first feature having a shape corresponding to the aggregate shape of the first subset of geometry elements, the first feature being meaningful to an application; and
means for applying the first feature to at least one of the output devices.

37. The computer system of claim 36, wherein the first feature comprises a first sub-subset of geometry elements and a second sub-subset of geometry elements disconnected from the first sub-subset of geometry elements.

38. The computer system of claim 36, further comprising
means for organizing the data to represent a second feature, the second feature being meaningful to an application the second feature comprising a second subset of the plurality of geometry elements wherein the second subset of geometry elements overlaps the first subset of geometry elements.

39. The computer system of claim 38, wherein the second feature is a sub-subset of the first feature.

40. The computer system of claim 36, further comprising means for attaching a material property to the first feature so that the material property applies to all geometry elements in the first subset of the plurality of geometry elements.

41. The computer system of claim 36, wherein the organizing is accomplished interactively.

42. A computer system for adjusting geological data, representing a model of the characteristics of a geological region, to better match data acquired from the geological region, the computer system comprising a processor, a data storage system at least one input device, and at least one output device, the geological data stored on computer-readable media, the computer system comprising means for organizing the data to represent the geological region;

means for subdividing the region into a first geometry element and a second geometry element with a boundary separating the first geometry element and the second geometry element at a first location so that the first geometry element is on the first side of the boundary and the second geometry element is on the second side of the boundary;

means for attaching a bounded-from-first-side property and a bounded-from-second-side property to the boundary the bounded-from-first-side property defining a first feature on the first side of the boundary the bounded-from-second-side property defining a second feature on the second side of the boundary;

means for dissociating the boundary from the region by deactivating the boundary and means for subdividing the region with the boundary at a new location by reactivating the boundary at the new location, the region on the first side of the boundary being the first feature and the region on the second side of the boundary being the second feature.

43. The computer system of claim 42, further comprising means for attaching a material property to the boundary; and means for evaluating the material property at a point in the region as a boundary value problem using a value of the material property attached to the boundary as the boundary value.

44. A computer system for adjusting geological data representing a model of the characteristics of a geological region to better match data acquired from the geological region, the computer system comprising a processor, a data storage system, at least one input device, and at least one output device, the geological data stored on computer-readable media, the computer system comprising means for organizing the data to represent a first plurality of geometry elements and a classification geometry element;

means for attaching a material property to each geometry element in a subset of the first plurality of geometry elements;

means for classifying the classification geometry element into the subset to produce a second plurality of geometry elements and a third plurality of geometry elements; and means for propagating the material property from the subset to the second plurality of geometry elements.

45. The computer system of claim 44, further comprising means for propagating the material property from the classification geometry element to the second plurality of geometry elements.

46. A computer system for adjusting geological data representing a model of the characteristics of a geological region, to better match data acquired from the geological region, the computer system comprising a processor, a data storage system, at least one input device, and at least one output device, the geological data stored on computer-readable media, the computer system comprising means for organizing the data to represent a first plurality of geometry elements;

means for attaching a material property to each of the first plurality of geometry elements;

means for producing a second plurality of geometry elements by splitting or merging the geometry elements in the first plurality of geometry elements; and means for propagating the material property from the first plurality of geometry elements to the second plurality of geometry elements.

47. A computer system for adjusting geological data representing a model of the characteristics of a geological region, to better match data acquired from the geological region, the computer system comprising a processor, a data storage system, at least one input device, and at least one output device, the geological data being stored on computer-readable media, the computer system comprising means for defining, in any order:

a topology of a feature comprising a set of geometry elements, each geometry element corresponding to a subset of the region, the feature being meaningful to an application;

a material property for the feature; and a shape for the feature, the shape corresponding to the aggregate shape of the set of geometry elements.

48. A computer system for adjusting geological data representing a model of the characteristics of a geological region to better match data acquired from the geological region, the computer system comprising a processor, a data storage system, at least one input device, and at least one output device, the geological data being stored on computer-readable media, the computer system comprising means for organizing the data into a feature comprising a set of geometry elements, each geometry element corresponding to a subset of the region, the feature being meaningful to an application, means for attaching to the feature a first plurality of properties;

means for attaching to the feature a second plurality of properties;

means for activating the second plurality of properties and deactivating the first plurality of properties.

49. A computer program, residing on a computer-readable medium, comprising instructions for causing a computer, comprising a processor a data storage system, at least one input device, and at least one output device, to acquire geological data representing a model of the characteristics of a geological region;

organize the data to represent a first geometry element, the first geometry element corresponding to a subset of the region and having an interior, boundary and exterior and having points each point having a location on the interior or the boundary of the first geometry element, and a second geometry element, the second geometry element having an interior, an external boundary and an exterior and having points each point having a location on the interior or the external boundary of the second geometry element;

align at least a portion of the points of the second geometry element with at least a portion of the points of the first geometry element in response to input data received by the programmed computer through at least one of the input devices;

classify the second geometry element against the first geometry element to combine the first and second geometry elements, wherein classifying comprises deciding whether to retain a point on one of the geometry elements depending on whether the location of the point coincides with the interior, boundary or exterior of the other geometry element, wherein not retaining a point comprises
   deactivating the point if the geometry element of which it is a part has been designated a feature;
   discarding the point otherwise applying the retained points to at least one of the output devices.

50. The computer program of claim 49, wherein the dimension of the second geometry element is different from the dimension of the first geometry element.

51. The computer program of claim 49, wherein classifying comprises instructions for causing the computer to
retain the following points:
   (I) points in the interior of the first geometry element and in the interior of the second geometry element:
   (II) points in the interior of the first geometry element and in the exterior of the second geometry element;
   (IV) points on the boundary of the first geometry element and on the boundary of the second geometry element;
   (V) points on the boundary of the first geometry element and in the interior of the second geometry element;
   (VI) points on the boundary of the second geometry element and in the interior of the first geometry element;
   (VII) points on the boundary of the first geometry element and in the exterior of the second geometry element; and
not retain the remaining points.

52. The computer program of claim 49, wherein classifying comprises instructions for causing the computer to
retain the following points:
   (I) points in the interior of the first geometry element and in the interior of the second geometry element;
   (II) points in the interior of the first geometry element and in the exterior of the second geometry element;
   (III) points on the boundary of the second geometry element and in the exterior of the first geometry element;
   (IV) points on the boundary of the first geometry element and on the boundary of the second geometry element;
   (V) points on the boundary of the first geometry element and in the interior of the second geometry element;
   (VII) points on the boundary of the first geometry element and in the exterior of the second geometry element;
   (VIII) points on the boundary of the second geometry element and in the exterior of the first geometry element; and
not retain the remaining points.

53. The computer program of claim 49, wherein classifying comprises instructions for causing the computer to
retain the following points:
   (I) points in the interior of the first geometry element and in the interior of the second geometry element;
   (III) points on the boundary of the second geometry element and in the exterior of the first geometry element;
   (IV) points on the boundary of the first geometry element and on the boundary of the second geometry element;
   (V) points on the boundary of the first geometry element and in the interior of the second geometry element;
   (VI) points on the boundary of the second geometry element and in the interior of the first geometry element;
   (VIII) points on the boundary of the second geometry element and in the exterior of the first geometry element; and
not retain the remaining points.

54. A computer program, residing on a computer-readable medium, comprising instructions for causing a computer, comprising a processor, a data storage system, at least one input device, and at least one output device, to acquire geological data representing a model of the characteristics of a geological region;

organize the data to represent a geometry element comprising at least two cells with topological relationships between the cells, the geometry element having a shape;

topologically edit the geometry element by revising the topological relationship between the cells or the shape of the geometry element in response to an input received by the programmed computer through at least one input device; and apply the edited points to at least one of the output devices.

55. The computer program of claim 54, wherein editing comprises instructions for causing the computer to change the topological relationship between the cells without changing the shape of the geometry element.

56. The computer program of claim 54,
wherein the instructions for causing the computer to edit comprise instructions for causing the computer to
not retain a cell from the geometry element.

57. The computer program of claim 54,
wherein the instructions for causing the computer to edit comprise instructions for causing the computer to
change the topological relationship between the cells and change the shape of the geometry element.

58. A computer program, residing on a computer-readable medium, comprising instructions for causing a computer, comprising a processor, a data storage system, at least one input device, and at least one output device, to acquire geological data representing a model of the characteristics of a region;

organize the data into a database stored on the computer-readable media, the database comprising a geometry part and a design part, the geometry part being separate from the design part, the design part comprising data related to a feature, the feature having contextual meaning to an application, feature data in the design part being accessible by providing the name of the feature to the design part, the geometry part comprising data related to the feature, feature data in the geometry part being accessible by providing the name of the feature to the geometry part;

access the feature data from the design part and the feature data from the geometry part; and provide the feature data to the application.

59. The computer program of claim 58, wherein the design part of the database comprises a description of the geometry part of the database.

60. A computer program, residing on a computer-readable medium, comprising instructions for causing a computer, comprising a processor, a data storage system, at least one input device, and at least one output device, to acquire data;

store the data on the computer-readable medium organize the data to represent a plurality of sub-regions and a feature comprising a subset of the plurality of sub-regions, the feature having a shape corresponding to the aggregate shape of the subset of sub-regions; and apply the first feature to at least one of the output devices.

61. The computer program of claim 60, wherein the first feature comprises a first sub-subset of geometry elements and a second sub-subset of geometry elements disconnected from the first sub-subset of geometry elements.

62. The computer program of claim 60, further comprising instructions for causing the computer to organize the data to represent a second feature, the second feature being meaningful to an application, the second feature comprising a second subset of the plurality of wherein the second subset of geometry elements overlaps the first subset of geometry elements.

63. The computer program of claim 62, wherein the second feature is a sub-subset of the first feature.

64. The computer program of claim 60, further comprising instructions for causing the computer to attach a material property to the first feature so that the material property applies to all geometry elements in the first subset of the plurality of geometry elements.

65. The computer program of claim 60, wherein the instructions for causing the computer to organize operate interactively.

66. A computer program, residing on a computer-readable medium, comprising instructions for causing a computer, comprising a processor, a data storage system, at least one input device, and at least one output device, to acquire geological data, representing a model of the characteristics of a geological region;

organize the data to represent the geological region;

subdivide the region into a first geometry element and a second geometry element with a boundary separating the first geometry element and the second geometry element at a first location so that the first geometry element is on the first side of the boundary and the second geometry element is on the second side of the boundary;

attach a bounded-from-first-side property and a bounded-from-second-side property to the boundary the bounded-from-first-side property defining a first feature on the first side of the boundary the bounded-from-second-side property defining a second feature on the second side of the boundary;

dissociate the boundary from the region by deactivating the boundary; and subdivide the region with the boundary at a new location by reactivating the boundary at the new location, the region on the first side of the boundary being the first feature and the region on the second side of the boundary being the second feature.

67. The computer program of claim 66, further comprising instructions for causing the computer to attach a material property to the boundary; and evaluate the material property at a point in the region as a boundary value problem using a value of the material property attached to the boundary as the boundary value.

68. A computer program, residing on a computer-readable medium, comprising instructions for causing a computer, comprising a processors a data storage system, at least one input device, and at least one output device to acquire geological data representing a model of the characteristics of a geological region;

organize the data to represent a first plurality of geometry elements and a classification geometry element;

attach a material property to each geometry element in a subset of the first plurality of geometry elements;

classify the classification geometry element into the subset to produce a second plurality of geometry elements and a third plurality of geometry elements; and propagate the material property from the subset to the second plurality of geometry elements.

69. The computer program of claim 68, further comprising instructions for causing the computer to propagate the material property from the classification geometry element to the second plurality of geometry elements.

70. A computer program, residing on a computer-readable medium, comprising instructions for causing a computer, comprising a processor a data storage system, at least one input device, and at least one output device to acquire geological data representing a model of the characteristics of a geological region;

organize the data to represent a first plurality of geometry elements;

attach a material property to each of the first plurality of geometry elements;

produce a second plurality of geometry elements by splitting or merging the geometry elements in the first plurality of geometry elements; and propagate the material property from the first plurality of geometry elements to the second plurality of geometry elements.

71. A computer program, residing on a computer-readable medium, comprising instructions for causing a computer, comprising a processor, a data storage system, at least one input device and at least one output device to acquire geological data representing a model of the characteristics of a geological region; and define, in any order:

a topology of a feature comprising a set of geometry elements, each geometry element corresponding to a subset of the region, the feature being meaningful to an application;

a material property for the feature; and a shape for the feature the shape corresponding to the aggregate shape of the set of geometry elements.

72. A computer program, residing on a computer-readable medium, comprising instructions for causing a computer, comprising a processor, a data storage system, at least one input device, and at least one output device, to acquire geological data representing a model of the characteristics of a geological region;

organize the data into a feature comprising a set of geometry elements, each geometry element corresponding to a subset of the region, the feature being meaningful to an application;

attach to the feature a first plurality of properties;

attach to the feature a second plurality of properties;

activate the second plurality of properties and deactivate the first plurality of properties.

* * * * *